United States Patent
Asami et al.

(10) Patent No.: US 9,753,256 B2
(45) Date of Patent: Sep. 5, 2017

(54) IMAGING LENS AND IMAGING APPARATUS

(71) Applicant: FUJIFILM Corporation, Tokyo (JP)

(72) Inventors: Taro Asami, Saitama-ken (JP); Yu Kitahara, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 51 days.

(21) Appl. No.: 14/858,419

(22) Filed: Sep. 18, 2015

(65) Prior Publication Data
US 2016/0011403 A1   Jan. 14, 2016

Related U.S. Application Data

(63) Continuation of application No. PCT/JP2013/007605, filed on Dec. 26, 2013.

(30) Foreign Application Priority Data

Mar. 26, 2013  (JP) ................. 2013-063272

(51) Int. Cl.
| | |
|---|---|
| G02B 13/18 | (2006.01) |
| G02B 9/62 | (2006.01) |
| G02B 13/00 | (2006.01) |
| G02B 27/00 | (2006.01) |
| G02B 13/04 | (2006.01) |
| G02B 15/177 | (2006.01) |

(Continued)

(52) U.S. Cl.
CPC ........... *G02B 13/0045* (2013.01); *G02B 9/62* (2013.01); *G02B 13/04* (2013.01);
(Continued)

(58) Field of Classification Search
CPC ...... G02B 13/0045; G02B 9/62; G02B 13/18; G02B 3/04; G02B 13/04; G02B 5/005;
(Continued)

(56) References Cited

U.S. PATENT DOCUMENTS

| | | | |
|---|---|---|---|
| 5,625,497 A | 4/1997 | Emomoto |
| 5,999,329 A | 12/1999 | Ohtake |
| | (Continued) | | |

FOREIGN PATENT DOCUMENTS

| | | |
|---|---|---|
| JP | 45-028071 | 9/1970 |
| JP | 55-17132 | 2/1980 |
| | (Continued) | |

OTHER PUBLICATIONS

Japanese Official Action—2015-237285—Aug. 9, 2016.
(Continued)

*Primary Examiner* — Evelyn A Lester
(74) *Attorney, Agent, or Firm* — Young & Thompson

(57) ABSTRACT

An imaging lens consists of, in order from the object side, a negative first lens, a positive second lens, a positive third lens, a negative fourth lens, a positive fifth lens, and a positive sixth lens. The imaging lens satisfies the condition expressions below:

$$f1/f<-1.68 \quad (1\text{-}2),$$

$$-0.7<f4/f \quad (2),$$

$$-0.6<(R3+R4)/(R3-R4)<2.2 \quad (11\text{-}2), \text{ and}$$

$$0.5<f2/f3<4.0 \quad (12),$$

where f1 to f4 are focal lengths of the first to the fourth lenses, f is a focal length of the entire system, R3 is a radius of curvature of the object-side surface of the second lens, and R4 is a radius of curvature of the image-side surface of the second lens.

20 Claims, 14 Drawing Sheets

(51) Int. Cl.
   *G02B 9/00* (2006.01)
   *G02B 3/04* (2006.01)
   *G02B 5/00* (2006.01)
(52) U.S. Cl.
   CPC .......... *G02B 27/0025* (2013.01); *G02B 3/04* (2013.01); *G02B 5/005* (2013.01); *G02B 9/00* (2013.01); *G02B 13/001* (2013.01); *G02B 13/002* (2013.01); *G02B 13/18* (2013.01); *G02B 15/177* (2013.01)
(58) Field of Classification Search
   CPC .. G02B 13/002; G02B 13/001; G02B 15/177; G02B 9/00
   USPC .................. 359/708, 713, 740, 756, 761
   See application file for complete search history.

(56) References Cited

U.S. PATENT DOCUMENTS

| | | |
|---|---|---|
| 2005/0275951 A1 | 12/2005 | Otake |
| 2007/0097508 A1 | 5/2007 | Ohtake et al. |
| 2008/0180809 A1 | 7/2008 | Igarashi |
| 2008/0285159 A1 | 11/2008 | Kobayashi |
| 2009/0161236 A1* | 6/2009 | Kitahara .............. G02B 13/146 359/761 |
| 2010/0085651 A1 | 4/2010 | Asami |

FOREIGN PATENT DOCUMENTS

| | | |
|---|---|---|
| JP | 07-218825 | 8/1995 |
| JP | 09-179026 | 7/1997 |
| JP | 9-189857 | 7/1997 |
| JP | 09-230232 | 9/1997 |
| JP | 10-48524 | 2/1998 |
| JP | 11-23961 | 1/1999 |
| JP | 2002-162562 | 6/2002 |
| JP | 2005-164839 | 6/2005 |
| JP | 2005-352182 | 12/2005 |
| JP | 2006-309076 | 11/2006 |
| JP | 2007-121611 | 5/2007 |
| JP | 2008-107391 | 5/2008 |
| JP | 2008-287045 | 11/2008 |
| JP | 2010-090696 | 4/2010 |
| JP | 2010-090697 | 4/2010 |
| JP | 2010-91696 | 4/2010 |
| JP | 2010-91697 | 4/2010 |
| WO | 2014/155461 | 10/2014 |

OTHER PUBLICATIONS

International Search Report, PCT/JP2013/007605, Apr. 1, 2014.
PCT/IPEA/409.
Chinese Office Action dated Dec. 26, 2016; Application No. 2013800748660. (Partial translation).
German Official Action—11 2013 006 874.5—dated Jun. 2, 2017.

* cited by examiner

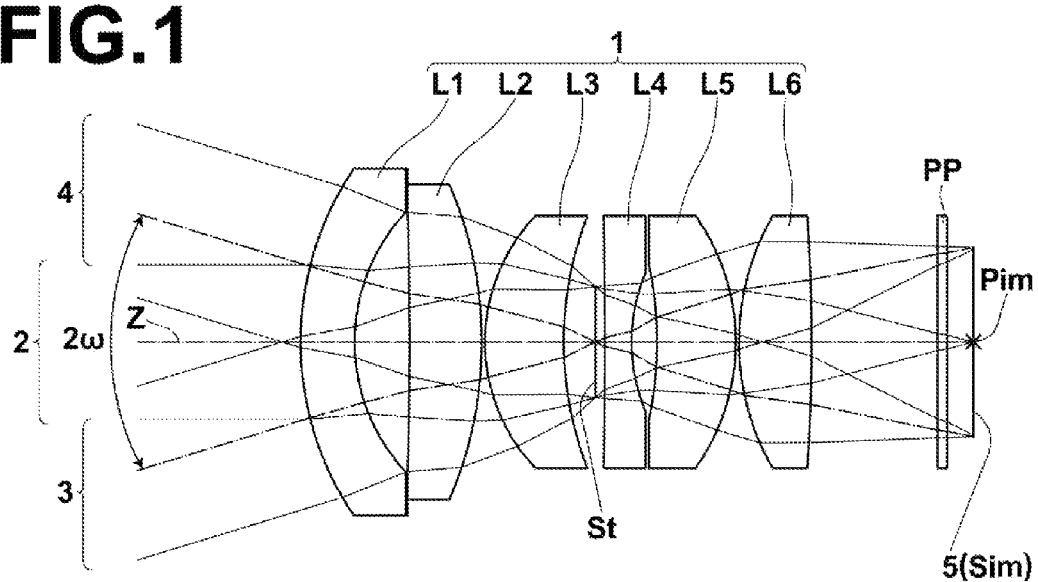
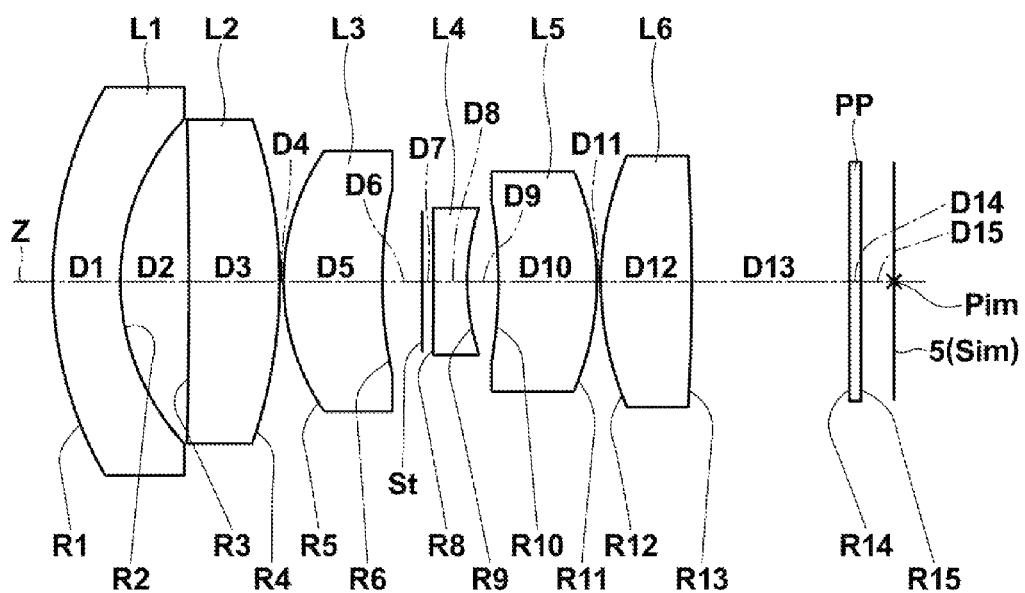

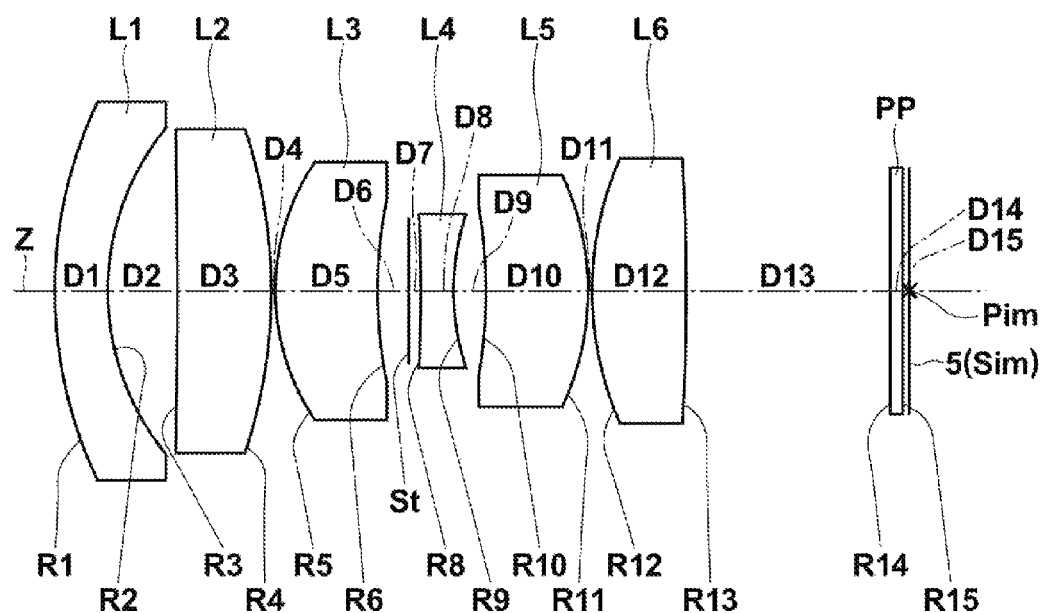
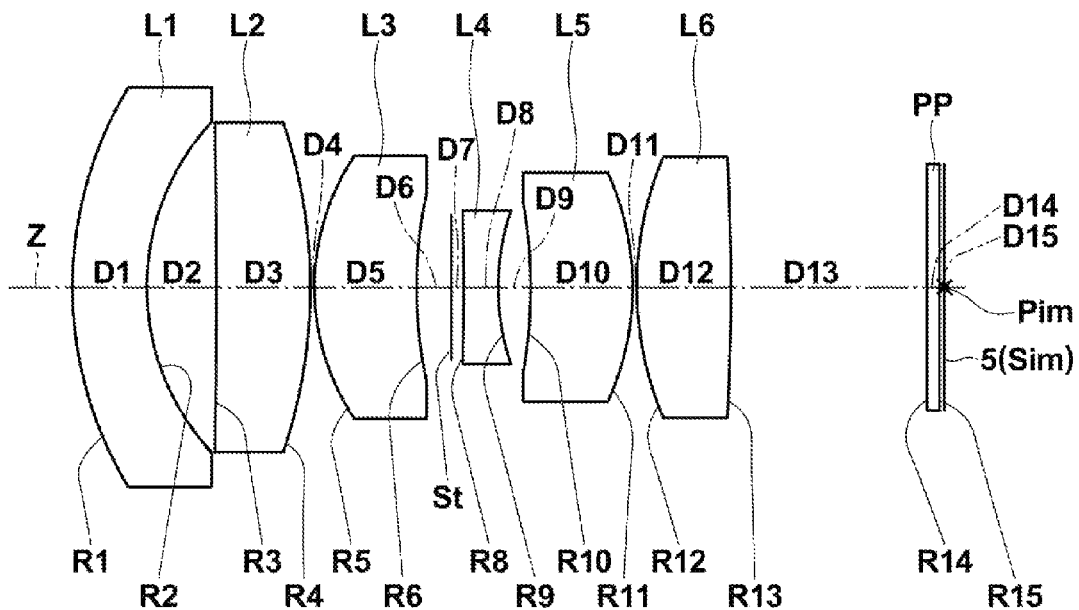

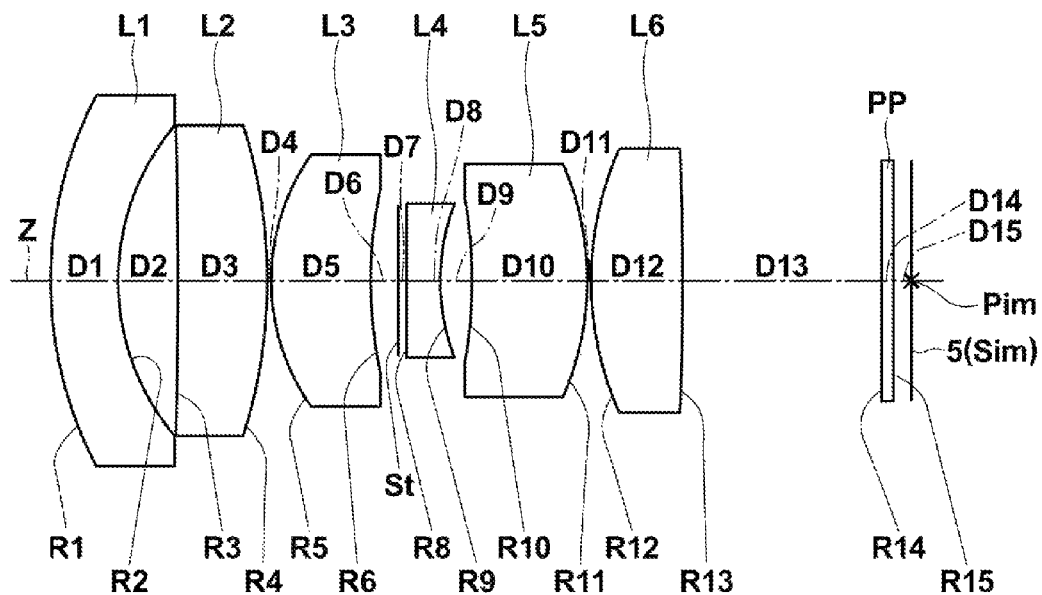
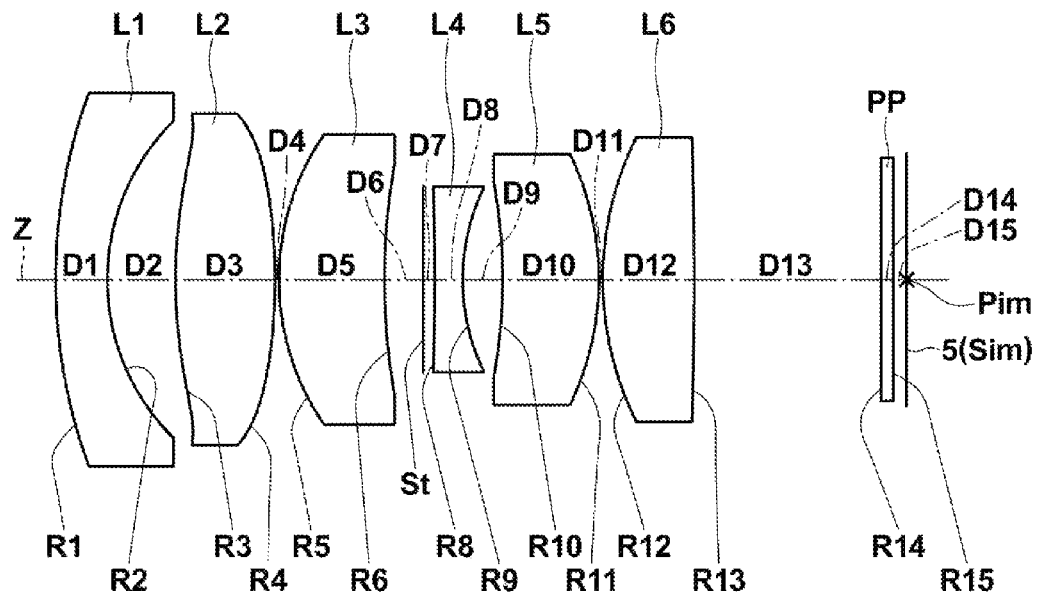

EXAMPLE 6

EXAMPLE 7

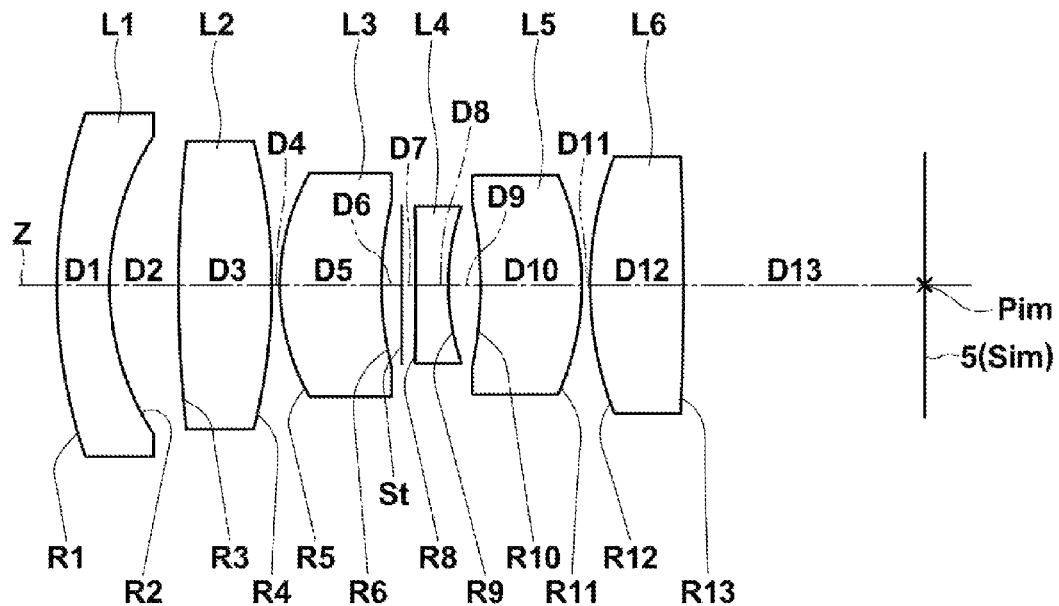
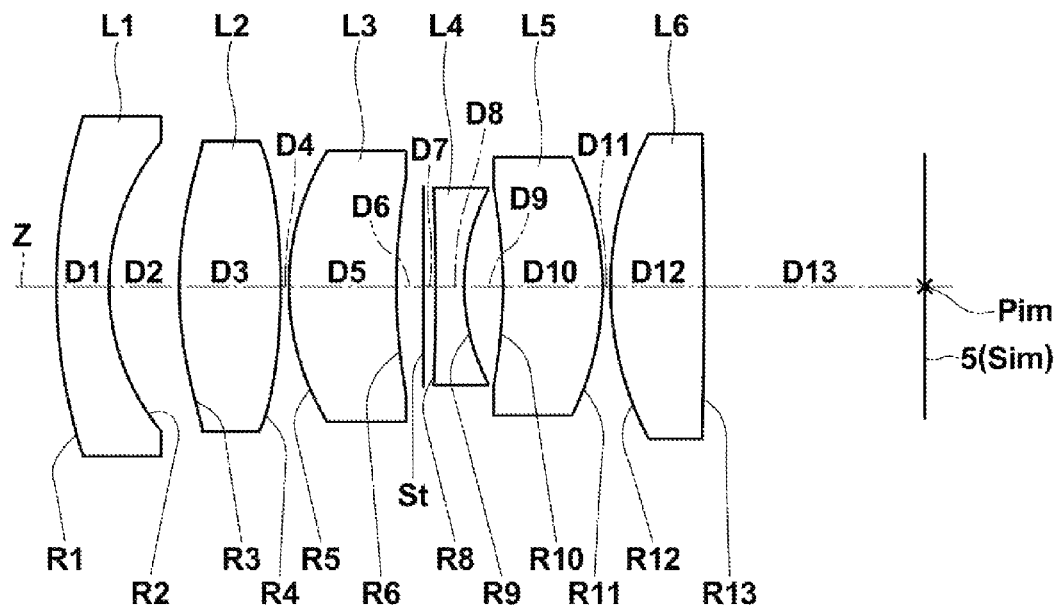

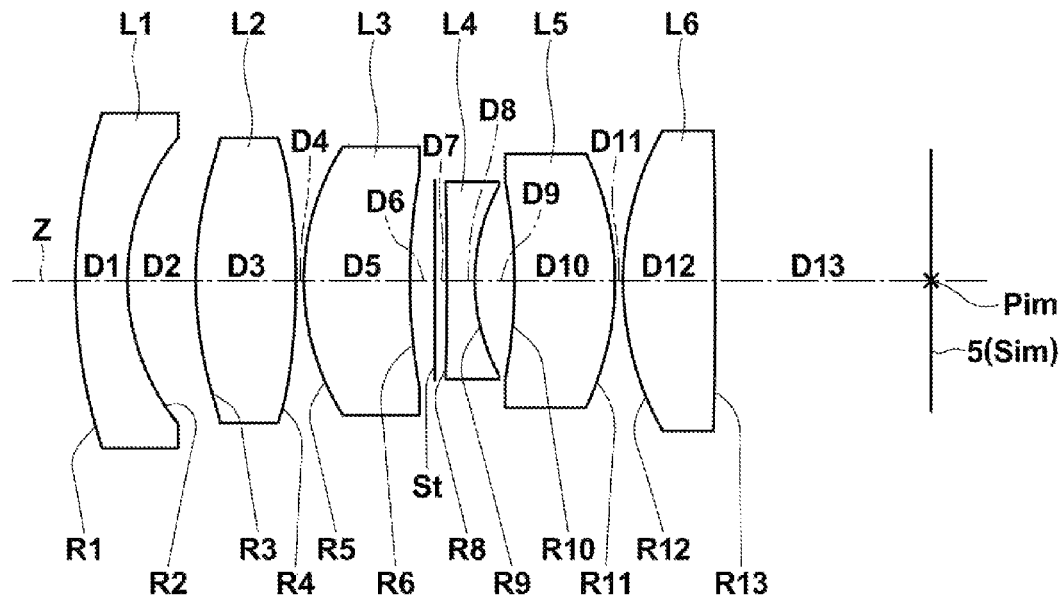
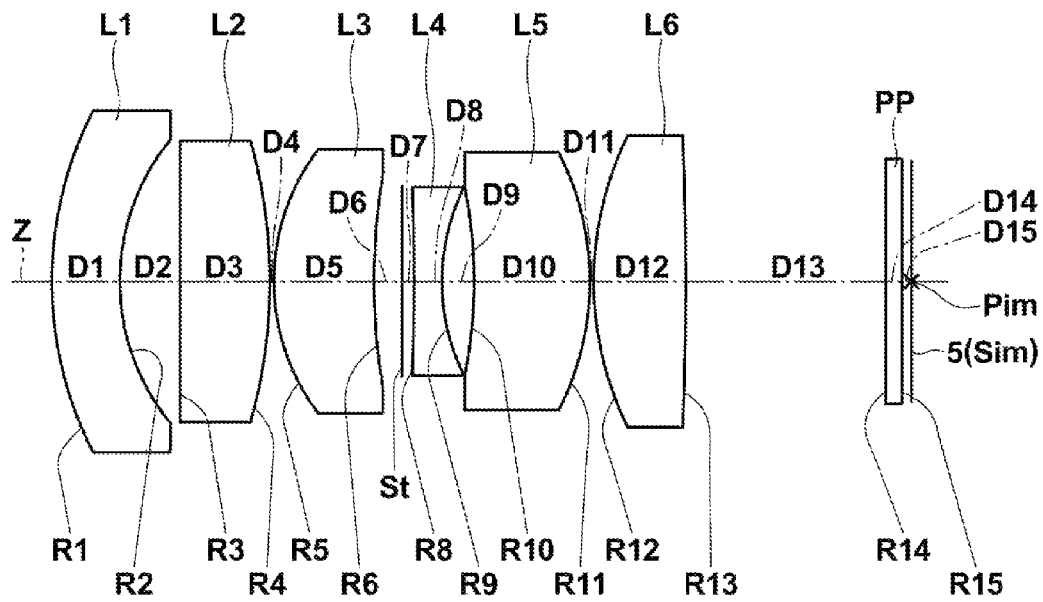

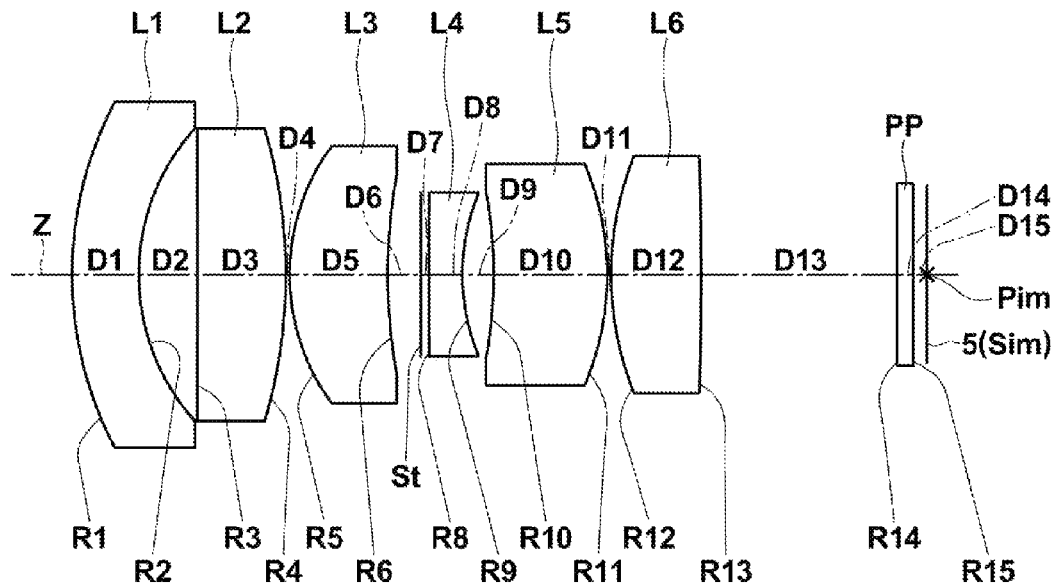
FIG.13 EXAMPLE 12
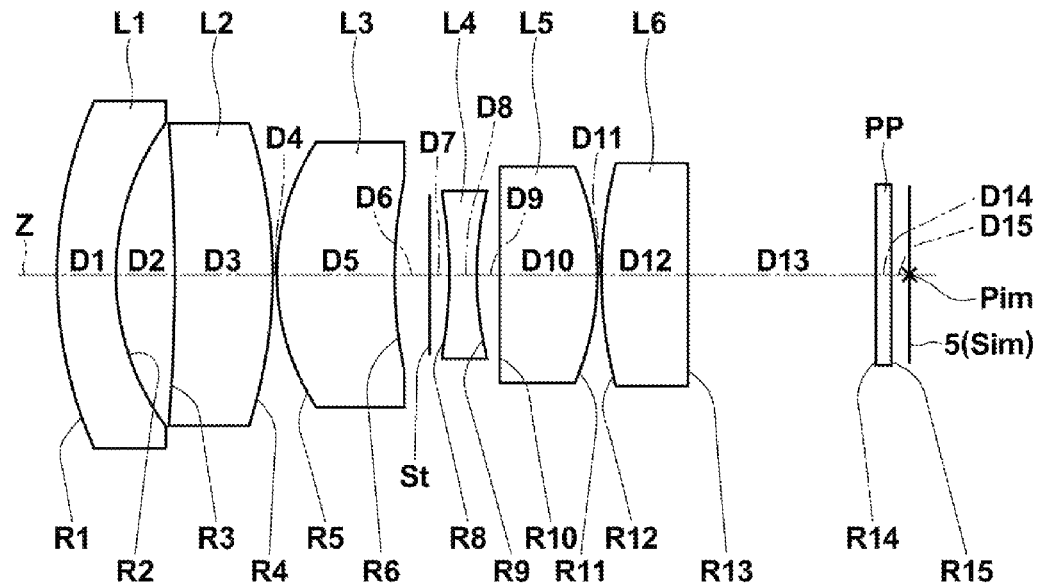
FIG.14 EXAMPLE 13

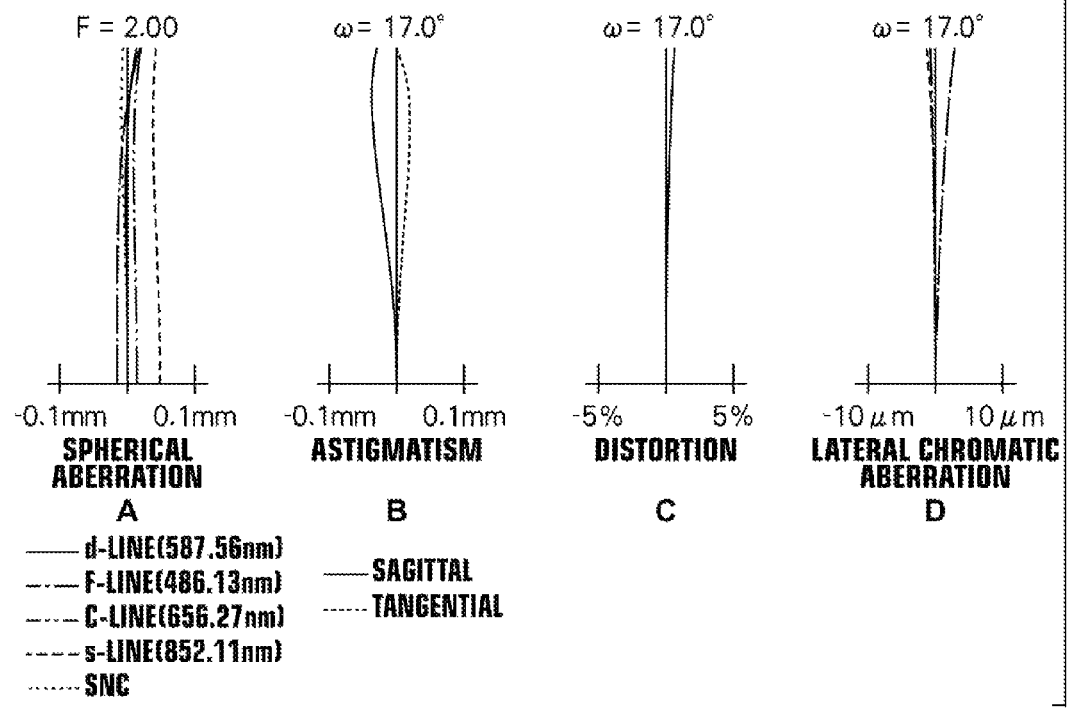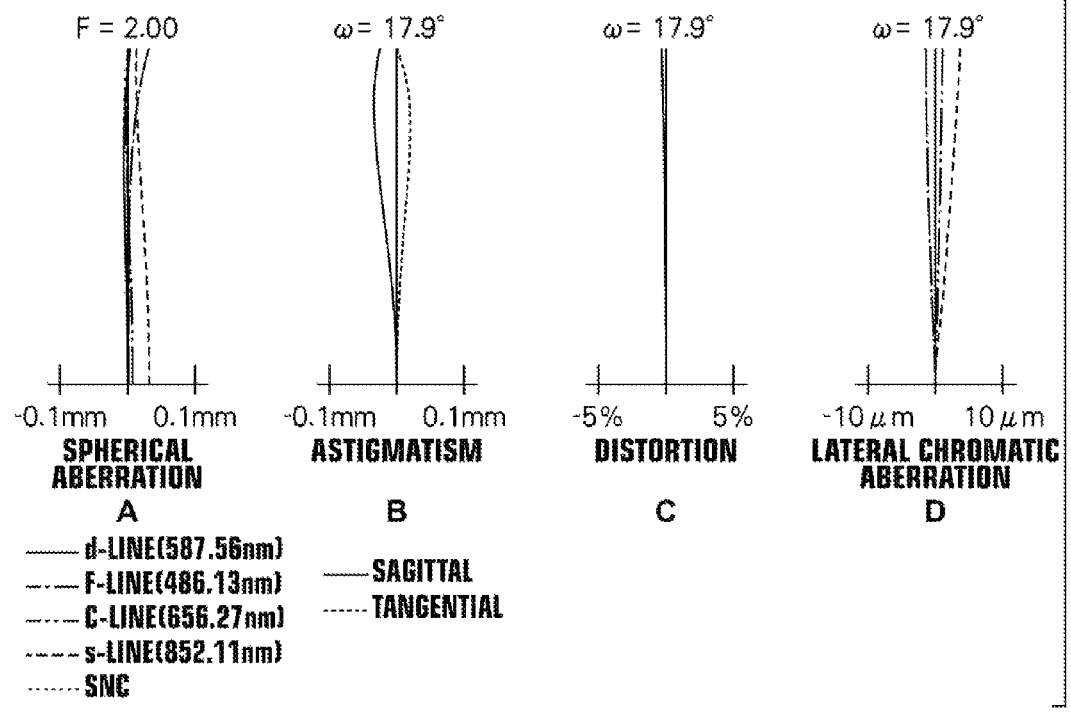

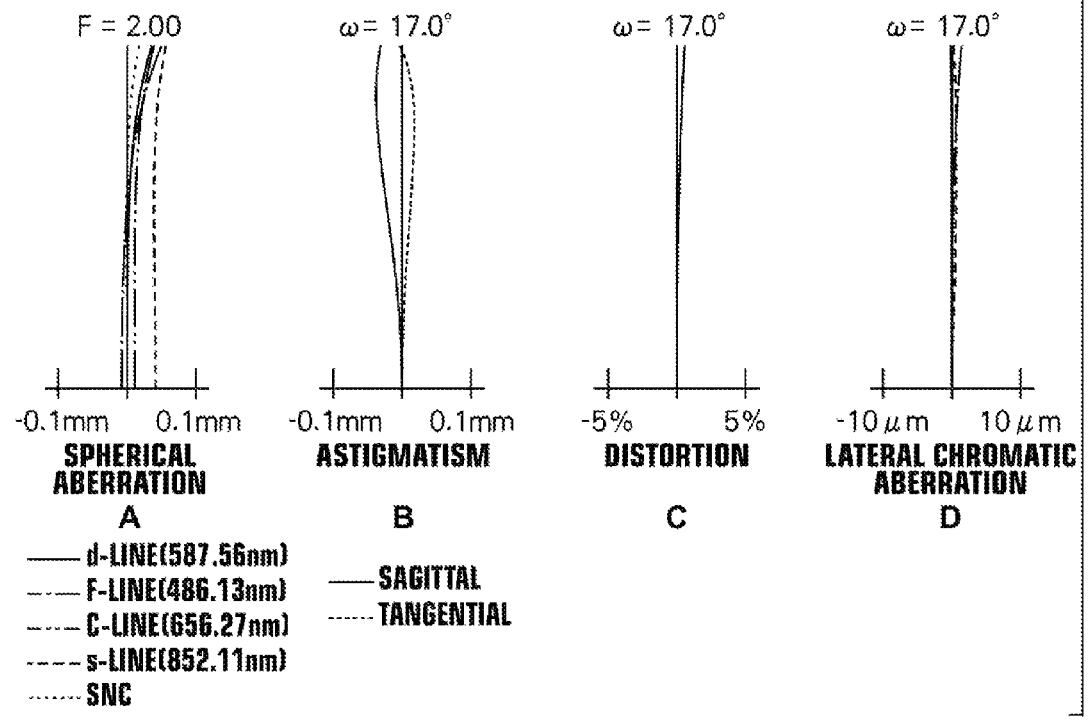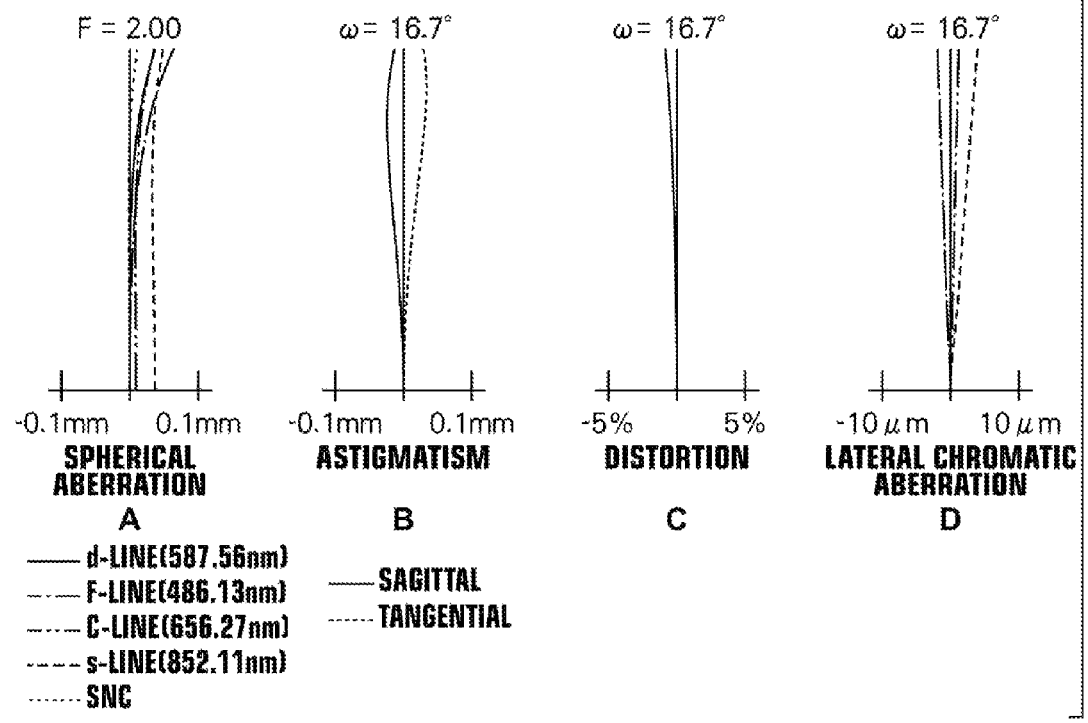

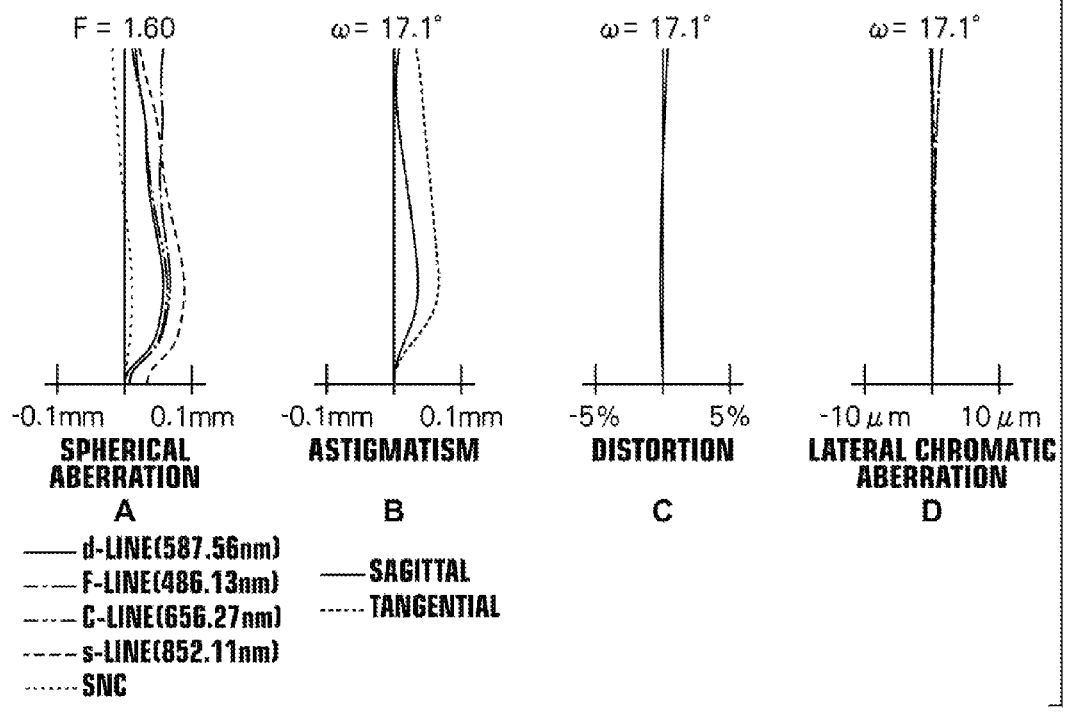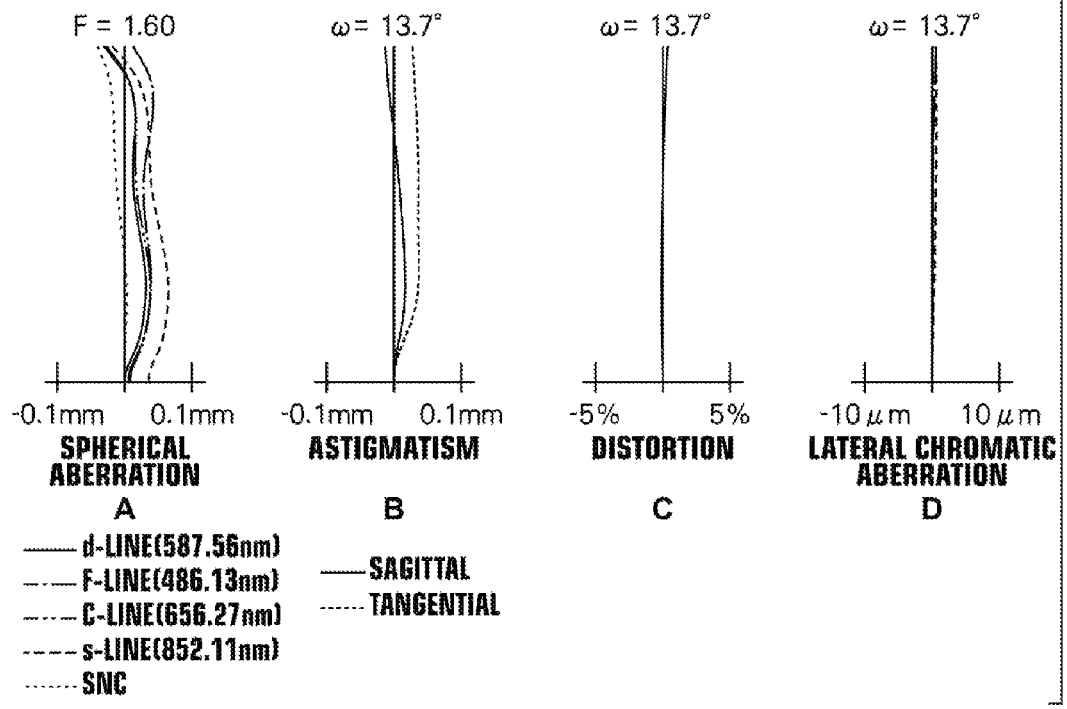

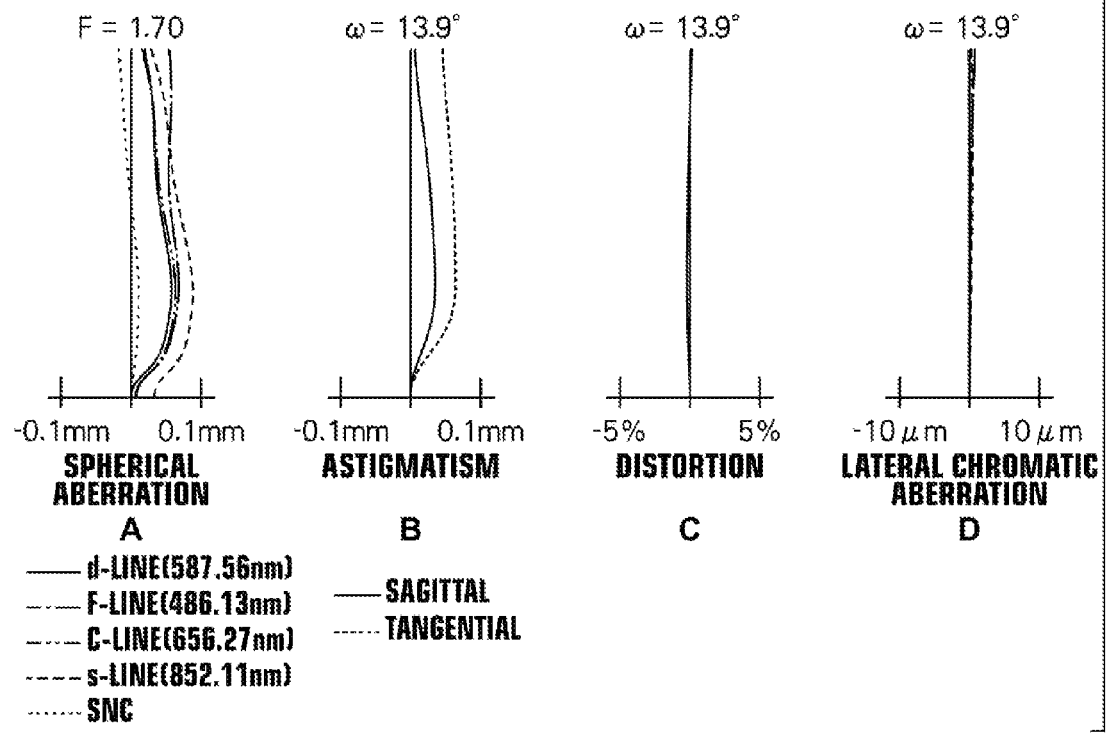
FIG.21 EXAMPLE 7
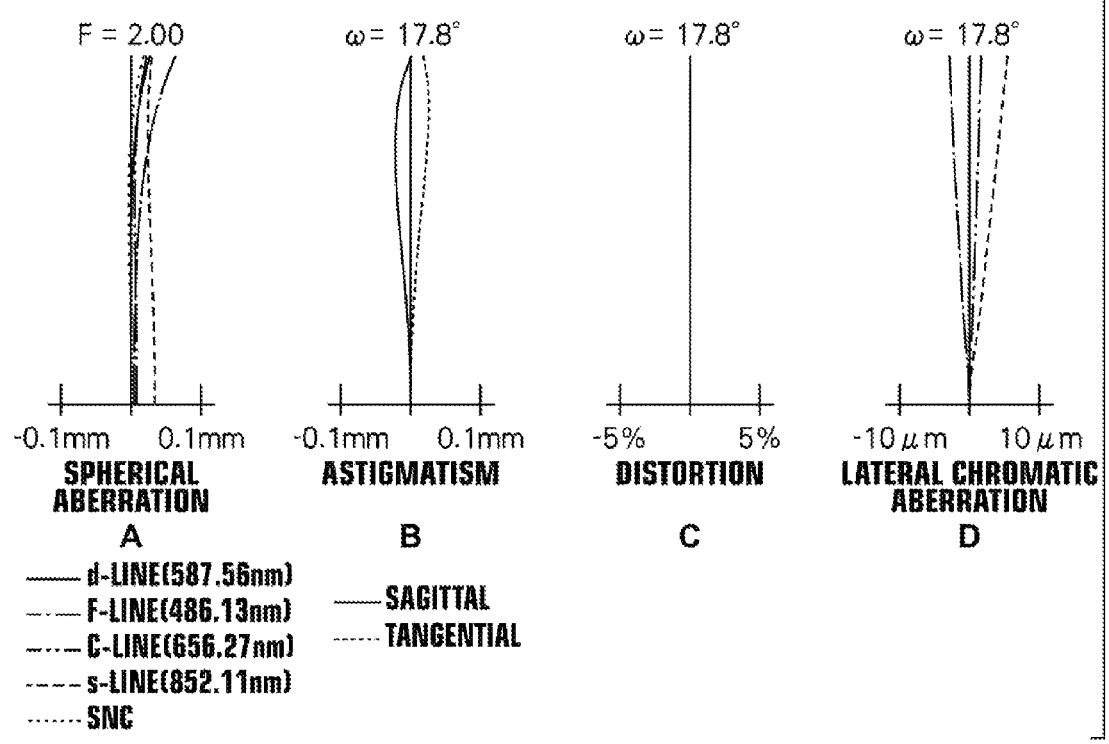
FIG.22 EXAMPLE 8

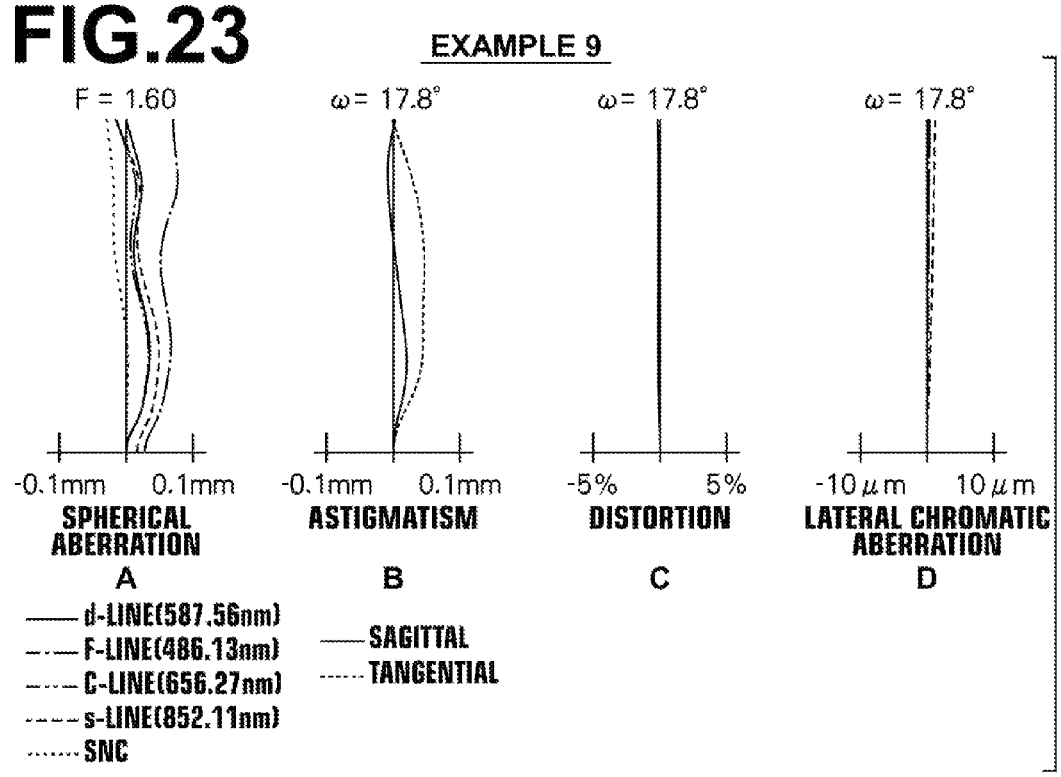
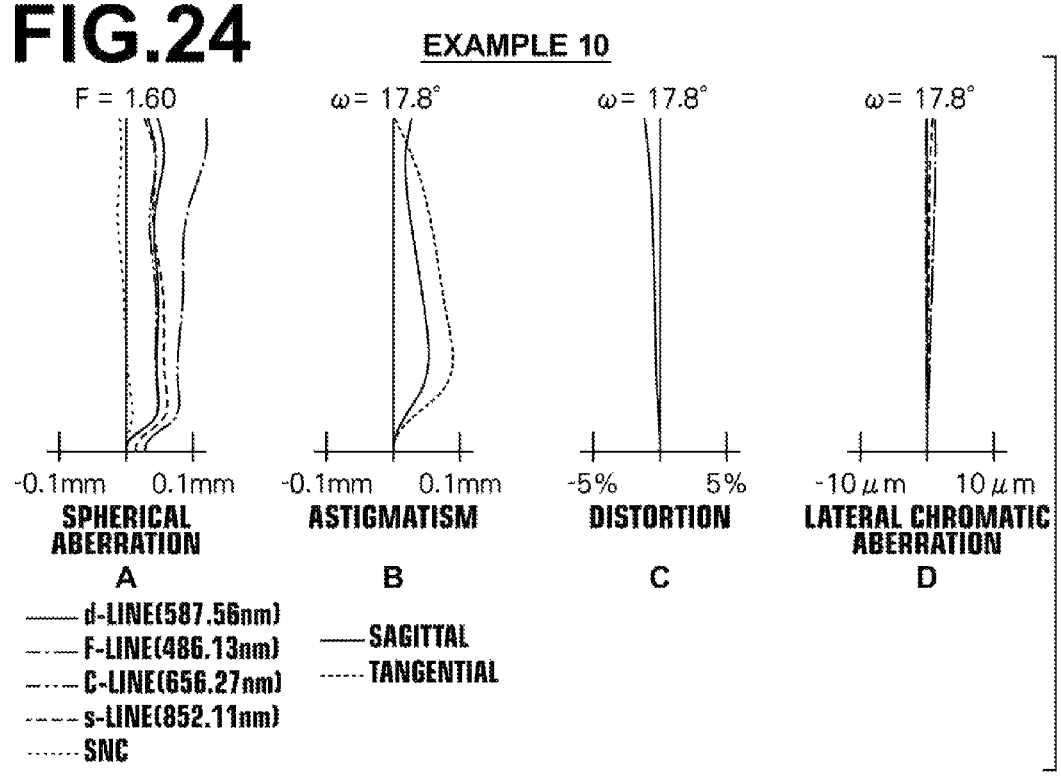

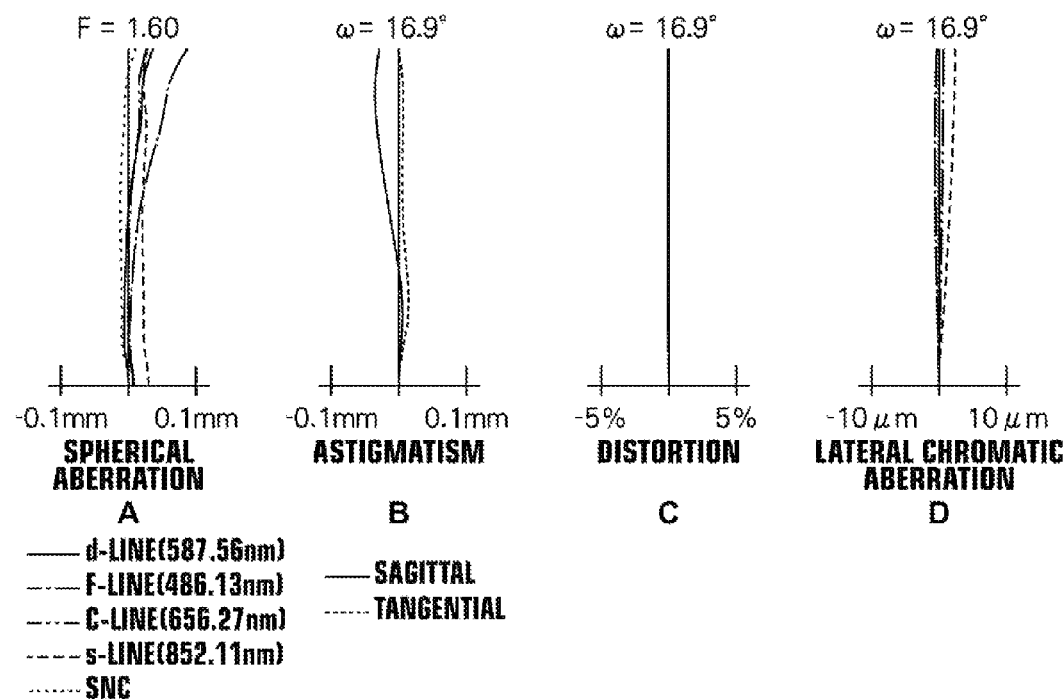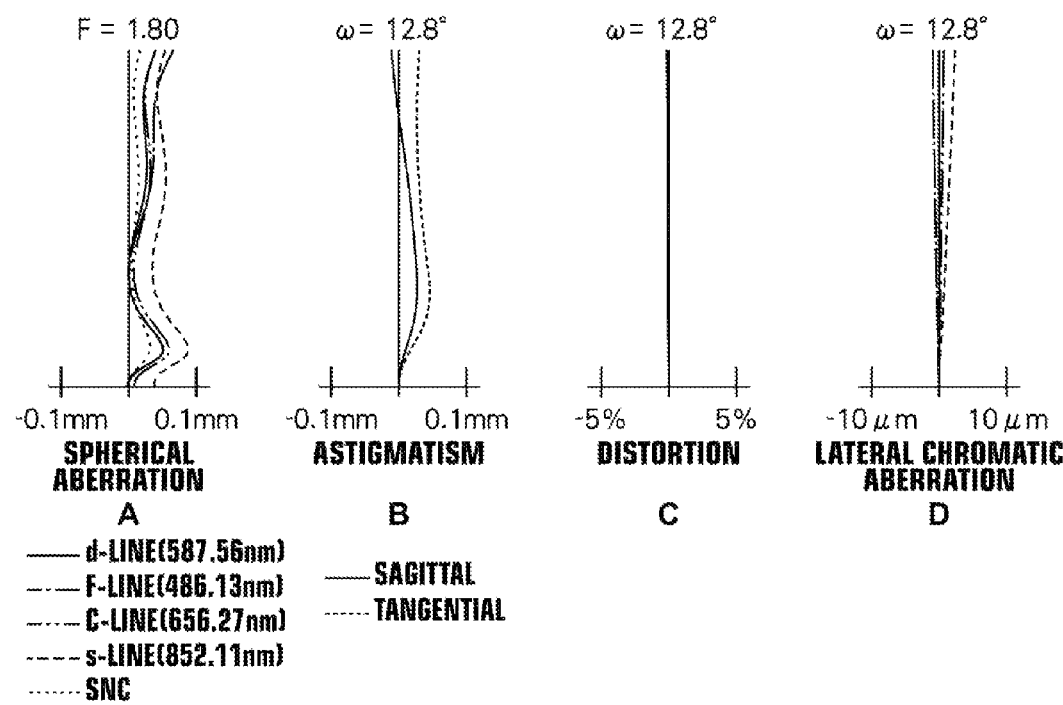

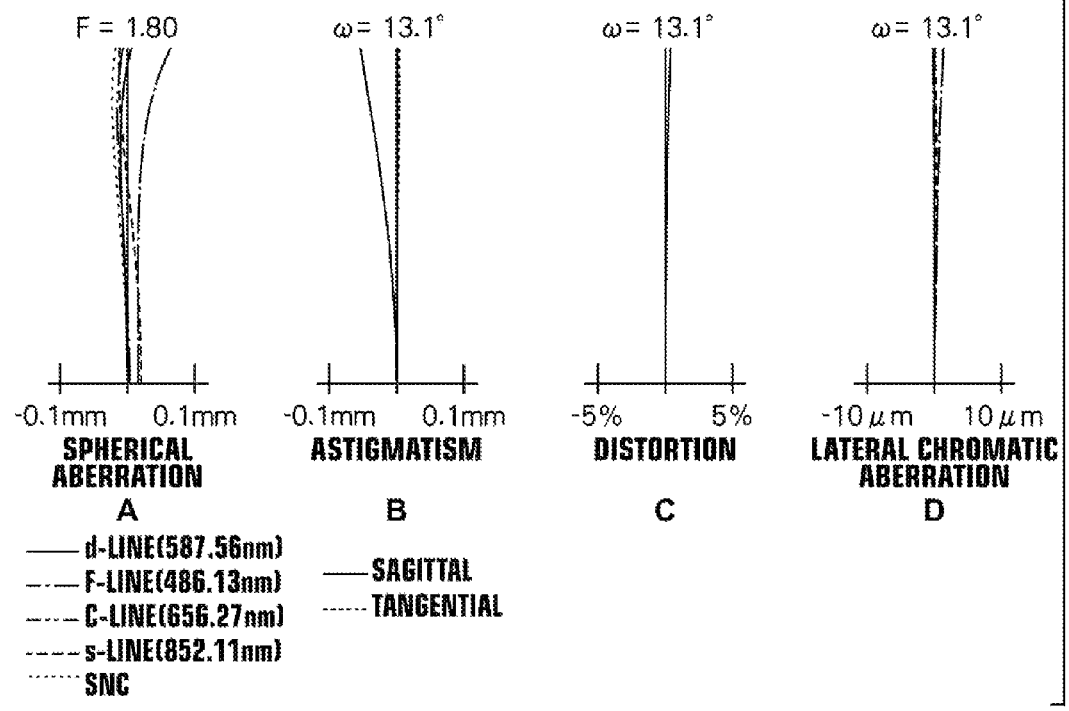
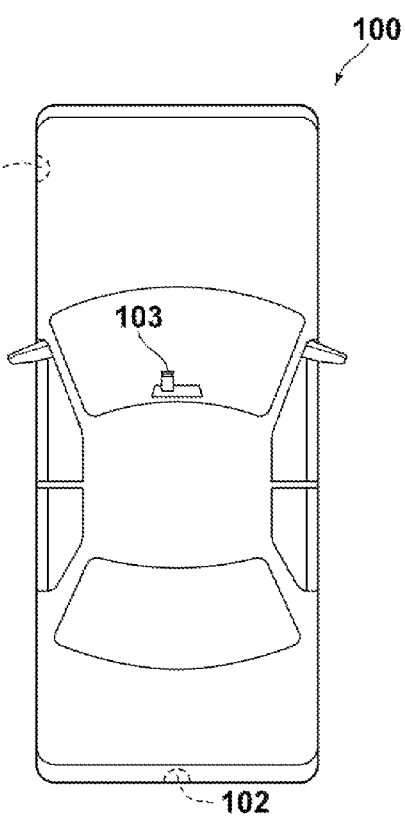

IMAGING LENS AND IMAGING APPARATUS

CROSS-REFERENCE TO RELATED APPLICATIONS

This application is a Continuation of PCT International Application No. PCT/JP2013/007605 filed on Dec. 26, 2013, which claims priority under 35 U.S.C. §119(a) to Japanese Patent Application No. 2013-063272 filed on Mar. 26, 2013. Each of the above applications is hereby expressly incorporated by reference, in its entirety, into the present application.

BACKGROUND

The present disclosure relates to an imaging lens and an imaging apparatus, and more particularly to an imaging lens that is preferably usable with an onboard camera, a camera for a mobile terminal, a monitoring camera, etc., using an image sensor, such as a CCD (Charge Coupled Device) or a CMOS (Complementary Metal Oxide Semiconductor), and an imaging apparatus provided with the imaging lens.

Image sensors, such as CCDs and CMOSs, are becoming more and more compact and being provided with increasingly higher pixel density in recent years. Along with this development, imaging apparatuses provided with such image sensors are becoming more and more compact, and there are demands for higher optical performance and size reduction of imaging lenses for use with such compact imaging apparatuses. On the other hand, with respect to imaging lenses for use with onboard cameras or monitoring cameras, there are demands for inexpensive imaging lenses with reduced size, wider angle of view, and higher performance.

Each of Japanese Unexamined Patent Publication Nos. 2008-287045, 2010-090696, 2010-090697, and 9(1997)-230232 (hereinafter, Patent Documents 1 to 4) proposes an imaging lens for use with an onboard camera, which imaging lens has a six-lens configuration consisting of, in order from the object side, a negative lens, a positive lens, a positive lens, a negative lens, a positive lens, and a positive lens.

SUMMARY

There are increasingly severe requirements for imaging lenses for use with onboard cameras or monitoring cameras, and it is desired to reduce the F-value, and achieve further cost reduction, wider angle of view, and higher performance.

In view of the above-described circumstances, the present disclosure is directed to providing an imaging lens that has a small F-value, and is capable of achieving cost reduction, wider angle of view, and higher performance, as well as an imaging apparatus provided with the imaging lens.

An imaging lens of a first aspect of the disclosure consists of, in order from the object side, a first lens having a negative power, a second lens having a positive power, a third lens having a positive power, a fourth lens having a negative power, a fifth lens having a positive power, and a sixth lens having a positive power, wherein the condition expressions below are satisfied:

$$f1/f < -1.6 \quad (1), \text{ and}$$

$$-0.7 < f4/f \quad (2),$$

where f1 is a focal length of the first lens, f4 is a focal length of the fourth lens, and f is a focal length of the entire system.

An imaging lens of a second aspect of the disclosure consists of, in order from the object side, a first lens having a negative power, a second lens having a positive power, a third lens having a positive power, a fourth lens having a negative power, a fifth lens having a positive power, and a sixth lens having a positive power, wherein the condition expressions below are satisfied:

$$2.4 < f1/f4 \quad (3), \text{ and}$$

$$0.0 < f3/f < 2.0 \quad (4),$$

where f is a focal length of the entire system, f1 is a focal length of the first lens, f3 is a focal length of the third lens, and f4 is a focal length of the fourth lens.

An imaging lens of a third aspect of the disclosure consists of, in order from the object side, a first lens having a negative power, a second lens having a positive power, a third lens having a positive power, a fourth lens having a negative power, a fifth lens having a positive power, and a sixth lens having a positive power, wherein the condition expression below is satisfied:

$$3.0 < vd2/vd4 \quad (5),$$

where vd2 is an Abbe number with respect to the d-line of a material forming the second lens, and vd4 is an Abbe number with respect to the d-line of a material forming the fourth lens.

An imaging lens of a fourth aspect of the disclosure consists of, in order from the object side, a first lens having a negative power, a second lens having a positive power, a third lens having a positive power, a fourth lens having a negative power, a fifth lens having a positive power, and a sixth lens having a positive power, wherein the condition expression below is satisfied:

$$3.2 < vd6/vd4 \quad (6),$$

where vd4 is an Abbe number with respect to the d-line of a material forming the fourth lens, and vd6 is an Abbe number with respect to the d-line of a material forming the sixth lens.

It should be noted that the imaging lens of the first aspect of the disclosure may have at least one of the features of the imaging lenses of the second, the third, and the fourth aspects. The imaging lens of the second aspect of the disclosure may have at least one of the features of the imaging lenses of the first, the third, and the fourth aspects. The imaging lens of the third aspect of the disclosure may have at least one of the features of the imaging lenses of the first, the second, and the fourth aspects. The imaging lens of the fourth aspect of the disclosure may have at least one of the features of the imaging lenses of the first, the second, and the third aspects. The imaging lens of each of the first, the second, the third, and the fourth aspects of the disclosure may have a part of the features of the other imaging lenses.

While the imaging lens of the disclosure consists of six lenses, the imaging lens of the disclosure may include, in addition to the six lenses: lenses substantially without any power; optical elements other than lenses, such as an aperture stop and a cover glass; mechanical components, such as a lens flange, a lens barrel, an image sensor, and a camera shake correcting mechanism; etc.

The surface shape, such as convex, concave, planar, biconcave, meniscus, biconvex, plano-convex, or plano-concave, and the sign, positive or negative, with respect to the refractive power of any lens including an aspheric surface, as described herein, are about the paraxial region, unless otherwise noted. The sign with respect to the radius of curvature is provided herein such that a positive radius of curvature indicates a surface that is convex toward the object side, and a negative radius of curvature indicates a surface that is convex toward the image side. A description "the lens surface has a positive power at the center" as used herein means that the paraxial curvature of the lens surface has such a value that the lens surface forms a convex surface. A description "the lens surface has a negative power at the center" as used herein means that the paraxial curvature of the lens surface has such a value that the lens surface forms a concave surface.

In the imaging lens of any of the first to the fourth aspects of the disclosure, the first lens may be made of a material having an Abbe number with respect to the d-line of 40 or more, the second lens may be made of a material having an Abbe number with respect to the d-line of 55 or more, the third lens may be made of a material having an Abbe number with respect to the d-line of 30 or more, the fourth lens may be made of a material having an Abbe number with respect to the d-line of 25 or less, the fifth lens may be made of a material having an Abbe number with respect to the d-line of 30 or more, and the sixth lens may be made of a material having an Abbe number with respect to the d-line of 30 or more.

In the imaging lens of any of the first to the fourth aspects of the disclosure, an aperture stop may be disposed between the image-side surface of the fourth lens and the object-side surface of the second lens.

In the imaging lens of any of the first to the fourth aspects of the disclosure, it is preferred that the condition expressions (7) to (16) below be satisfied. As preferred aspects, the imaging lens may have any one of or any combination of the features defined by the condition expressions (7) to (16) below:

$$1.8 < (R1+R2)/(R1-R2) \quad (7),$$

$$(R5+R6)/(R5-R6) < 0.0 \quad (8),$$

$$3.0 < (R10+R11)/(R10-R11) < 13.5 \quad (9),$$

$$1 < f12/f < 25 \quad (10),$$

$$-0.8 < (R3+R4)/(R3-R4) < 3.5 \quad (11),$$

$$0.5 < f2/f3 < 4.0 \quad (12),$$

$$0.2 < f5/f6 < 4.0 \quad (13),$$

$$0.4 < f6/f < 4.0 \quad (14),$$

$$0.3 < f23/f56 < 3.0 \quad (15),$$

$$1.0 < L/f < 5.0 \quad (16),$$

where R1 is a radius of curvature of the object-side surface of the first lens,
R2 is a radius of curvature of the image-side surface of the first lens,
R3 is a radius of curvature of the object-side surface of the second lens,
R4 is a radius of curvature of the image-side surface of the second lens,
R5 is a radius of curvature of the object-side surface of the third lens,
R6 is a radius of curvature of the image-side surface of the third lens,
R10 is a radius of curvature of the object-side surface of the fifth lens,
R11 is a radius of curvature of the image-side surface of the fifth lens,
f is a focal length of the entire system,
f2 is a focal length of the second lens,
f3 is a focal length of the third lens,
f5 is a focal length of the fifth lens,
f6 is a focal length of the sixth lens,
f12 is a combined focal length of the first lens and the second lens,
f23 is a combined focal length of the second lens and the third lens,
f56 is a combined focal length of the fifth lens and the sixth lens, and
L is a distance from the object-side surface of the first lens to the image plane (wherein a portion of the distance corresponding to the back focus is an equivalent air distance).

An imaging apparatus of the disclosure comprises the imaging lens of at least one of the first to the fourth aspects of the disclosure.

According to the imaging lens of the first aspect of the disclosure, which is a lens system formed by six lenses as the minimum configuration thereof, power distribution, etc., of the entire system are preferably set such that the condition expressions (1) and (2) are satisfied. This allows achieving size reduction, cost reduction, and wide angle of view, ensuring the back focus, and successfully correcting aberrations, to thereby accomplish an imaging lens that has high optical performance and is capable of obtaining a good image throughout the imaging area to the periphery.

According to the imaging lens of the second aspect of the disclosure, which is a lens system formed by six lenses as the minimum configuration thereof, power distribution, etc., of the entire system are preferably set such that the condition expressions (3) and (4) are satisfied. This allows achieving size reduction, cost reduction, and wide angle of view, ensuring the back focus, and successfully correcting aberrations, to thereby accomplish an imaging lens that has high optical performance and is capable of obtaining a good image throughout the imaging area to the periphery.

According to the imaging lens of the third aspect of the disclosure, which is a lens system formed by six lenses as the minimum configuration thereof, power distribution, etc., of the entire system are preferably set such that the condition expression (5) is satisfied. This allows achieving size reduction, cost reduction, and wide angle of view, ensuring the back focus, and successfully correcting aberrations, to thereby accomplish an imaging lens that has high optical performance and is capable of obtaining a good image throughout the imaging area to the periphery.

According to the imaging lens of the fourth aspect of the disclosure, which is a lens system formed by six lenses as the minimum configuration thereof, power distribution, etc., of the entire system are preferably set such that the condition expression (6) is satisfied This allows achieving size reduction, cost reduction, and wide angle of view, ensuring the back focus, and successfully correcting aberrations, to thereby accomplish an imaging lens that has high optical performance and is capable of obtaining a good image throughout the imaging area to the periphery.

The imaging apparatus of the disclosure, which is provided with the imaging lens of the disclosure, can be formed as a compact and inexpensive imaging apparatus and is capable of wide-angle imaging and obtaining a good image with high resolution.

BRIEF DESCRIPTION OF THE DRAWINGS

FIG. 1 is a diagram illustrating the configuration of and optical paths through an imaging lens according to one embodiment of the disclosure, FIG. 2 is a sectional view illustrating the lens configuration of an imaging lens of Example 1 of the disclosure, FIG. 3 is a sectional view illustrating the lens configuration of an imaging lens of Example 2 of the disclosure, FIG. 4 is a sectional view illustrating the lens configuration of an imaging lens of Example 3 of the disclosure, FIG. 5 is a sectional view illustrating the lens configuration of an imaging lens of Example 4 of the disclosure, FIG. 6 is a sectional view illustrating the lens configuration of an imaging lens of Example 5 of the disclosure, FIG. 9 is a sectional view illustrating the lens configuration of an imaging lens of Example 8 of the disclosure, FIG. 10 is a sectional view illustrating the lens configuration of an imaging lens of Example 9 of the disclosure, FIG. 11 is a sectional view illustrating the lens configuration of an imaging lens of Example 10 of the disclosure, FIG. 12 is a sectional view illustrating the lens configuration of an imaging lens of Example 11 of the disclosure, FIG. 13 is a sectional view illustrating the lens configuration of an imaging lens of Example 12 of the disclosure, FIG. 14 is a sectional view illustrating the lens configuration of an imaging lens of Example 13 of the disclosure, FIG. 15 shows, at A to D, aberration diagrams of the imaging lens of Example 1 of the disclosure, FIG. 16 shows, at A to D, aberration diagrams of the imaging lens of Example 2 of the disclosure, FIG. 17 shows, at A to D, aberration diagrams of the imaging lens of Example 3 of the disclosure, FIG. 18 shows, at A to D, aberration diagrams of the imaging lens of Example 4 of the disclosure, FIG. 19 shows, at A to D, aberration diagrams of the imaging lens of Example 5 of the disclosure, FIG. 20 shows, at A to D, aberration diagrams of the imaging lens of Example 6 of the disclosure, FIG. 21 shows, at A to D, aberration diagrams of the imaging lens of Example 7 of the disclosure, FIG. 22 shows, at A to D, aberration diagrams of the imaging lens of Example 8 of the disclosure, FIG. 23 shows, at A to D, aberration diagrams of the imaging lens of Example 9 of the disclosure, FIG. 24 shows, at A to D, aberration diagrams of the imaging lens of Example 10 of the disclosure, FIG. 25 shows, at A to D, aberration diagrams of the imaging lens of Example 11 of the disclosure, FIG. 26 shows, at A to D, aberration diagrams of the imaging lens of Example 12 of the disclosure, FIG. 27 shows, at A to D, aberration diagrams of the imaging lens of Example 13 of the disclosure, FIG. 28 is a diagram for explaining the layout of onboard imaging apparatuses according to an embodiment of the disclosure.

DETAILED DESCRIPTION OF THE PREFERRED EMBODIMENTS

Figure 7:
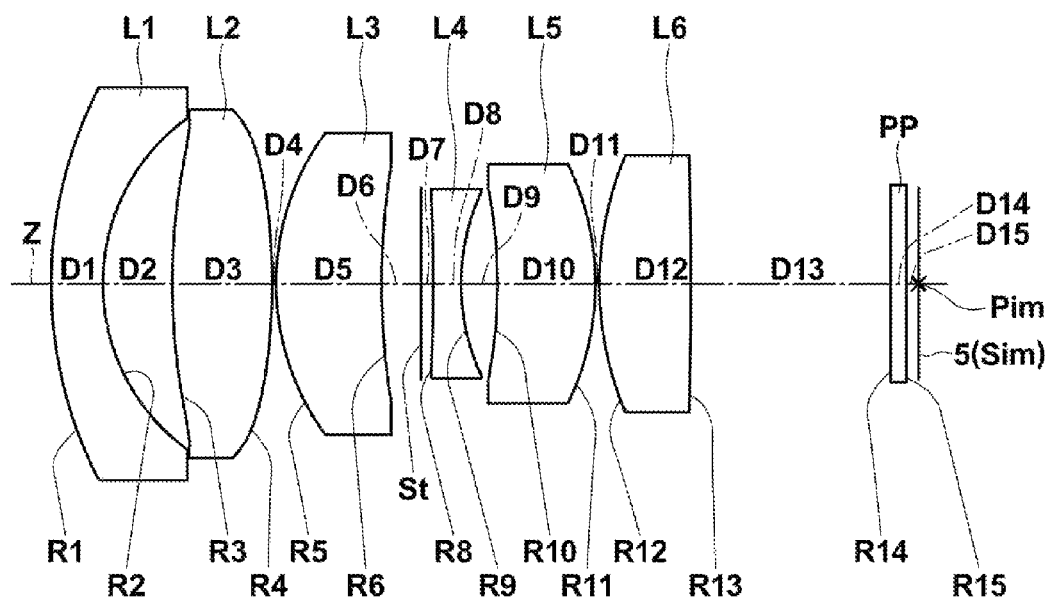
FIG. 7 is a sectional view illustrating the lens configuration of an imaging lens of Example 6 of the disclosure.

Hereinafter, embodiments of the present disclosure will be described in detail with reference to the drawings.
Embodiments of Imaging Lens First, an imaging lens according to embodiments of the disclosure is described with reference to FIG. 1. FIG. 1 is a diagram illustrating the configuration of and optical paths through the imaging lens according to one embodiment of the disclosure. It should be noted that the imaging lens 1 shown in FIG. 1 corresponds to an imaging lens according to Example 1 of the disclosure, which will be described later.

In FIG. 1, the left side is the object side, and the right side is the image side. FIG. 1 also shows an axial bundle of rays 2 and off-axis bundles of rays 3 and 4 at the full angle of view 2ω from object points at infinity. Assuming a case where the imaging lens 1 is applied to an imaging apparatus, FIG. 1 also shows an image sensor 5 positioned in an image plane Sim including an image point Pim of the imaging lens 1. The image sensor 5 converts an optical image formed by the imaging lens 1 into an electric signal. The image sensor 5 may be formed by a CCD image sensor or a CMOS image sensor, for example.

In the case where the imaging lens 1 is applied to an imaging apparatus, it is preferred to provide a cover glass, and a low-pass filter or an infrared cut-off filter, etc., depending on the configuration of the camera on which the lens is mounted. In the example shown in FIG. 1, an optical member PP in the form of a parallel plate which is assumed to represent the above-described elements is disposed between the most image-side lens and the image sensor 5 (the image plane Sim).

First, the configuration of a first embodiment of the disclosure is described. An imaging lens according to the first embodiment of the disclosure includes, in order from the object side, a first lens L1 having a negative power, a second lens L2 having a positive power, a third lens L3 having a positive power, a fourth lens L4 having a negative power, a fifth lens L5 having a positive power, and a sixth lens L6 having a positive power. In the example shown in FIG. 1, an aperture stop St is disposed between the third lens L3 and the fourth lens L4. It should be noted that the aperture stop St shown in FIG. 1 does not represent the shape and the size of the aperture stop, but represents the position of the aperture stop along the optical axis Z.

Further, the imaging lens of the first embodiment is configured to satisfy the condition expressions (1) and (2) below:

$$f1/f < -1.6 \quad (1), \text{ and}$$

$$-0.7 < f4/f \quad (2),$$

where f1 is a focal length of the first lens L1, f4 is a focal length of the fourth lens L4, and f is a focal length of the entire system.

The imaging lens of the first embodiment is formed by a small number of lenses, namely, six lenses as the minimum configuration thereof, thereby achieving cost reduction and reduction of the entire length in the optical axis direction. The first lens L1, which is the most object-side lens, having a negative power allows achieving a lens system having a wide angle of view, facilitates ensuring the back focus, and facilitates size reduction of the lens system in the radial direction. Distributing the positive power among the second lens L2 and the third lens L3 having positive powers and the fifth lens L5 and the sixth lens L6 having positive powers allows minimizing spherical aberration, and allows achieving good optical performance even when the imaging lens is a bright optical system having an F-value of 2.0 or less, for example.

Satisfying the upper limit of the condition expression (1) facilitates correcting distortion.

Satisfying the lower limit of the condition expression (2) facilitates providing the fourth lens L4 with a strong power, and this facilitates correcting axial chromatic aberration.

Next, the configuration of a second embodiment of the disclosure is described. An imaging lens according to the second embodiment of the disclosure includes, in order from the object side, a first lens L1 having a negative power, a second lens L2 having a positive power, a third lens L3 having a positive power, a fourth lens L4 having a negative power, a fifth lens L5 having a positive power, and a sixth lens L6 having a positive power.

Further, the imaging lens of the second embodiment is configured to satisfy the condition expressions (3) and (4) below:

$$2.4 < f1/f4 \qquad (3), \text{ and}$$

$$0.0 < f3/f < 2.0 \qquad (4),$$

where f is a focal length of the entire system, f1 is a focal length of the first lens L1, f3 is a focal length of the third lens L3, and f4 is a focal length of the fourth lens L4.

The imaging lens of the second embodiment is formed by a small number of lenses, namely, six lenses as the minimum configuration thereof, thereby achieving cost reduction and reduction of the entire length in the optical axis direction. The first lens L1, which is the most object-side lens, having a negative power allows achieving a lens system having a wide angle of view, facilitates ensuring the back focus, and facilitates size reduction of the lens system in the radial direction. Distributing the positive power among the second lens L2 and the third lens L3 having positive powers and the fifth lens L5 and the sixth lens L6 having positive powers allows minimizing spherical aberration, and allows achieving good optical performance even when the imaging lens is a bright optical system having an F-value of 2.0 or less, for example.

Satisfying the lower limit of the condition expression (3) prevents the negative power of the first lens L1 from becoming excessively strong, and facilitates providing the fourth lens L4 with a strong negative power, thereby facilitating correction of axial chromatic aberration and lateral chromatic aberration.

Satisfying the upper limit of the condition expression (4) facilitates providing the third lens L3 with a strong power, and this facilitates correcting spherical aberration and field curvature. It should be noted that the lens system of the second embodiment is an imaging lens and therefore the value of f is a positive value. Also, since the third lens L3 has a positive power, the value of f3 is a positive value. Therefore the value defined by the condition expression (4) is a positive value greater than 0.

Next, the configuration of a third embodiment of the disclosure is described. An imaging lens according to the third embodiment of the disclosure includes, in order from the object side, a first lens L1 having a negative power, a second lens L2 having a positive power, a third lens L3 having a positive power, a fourth lens L4 having a negative power, a fifth lens L5 having a positive power, and a sixth lens L6 having a positive power.

Further, the imaging lens of the third embodiment is configured to satisfy the condition expression below (5):

$$3.0 < vd2/vd4 \qquad (5),$$

where vd2 is an Abbe number with respect to the d-line of a material forming the second lens L2 and vd4 is an Abbe number with respect to the d-line of a material forming the fourth lens L4.

The imaging lens of the third embodiment is formed by a small number of lenses, namely, six lenses as the minimum configuration thereof, thereby achieving cost reduction and reduction of the entire length in the optical axis direction. The first lens L1, which is the most object-side lens, having a negative power allows achieving a lens system having a wide angle of view, facilitates ensuring the back focus, and facilitates size reduction of the lens system in the radial direction. Distributing the positive power among the second lens L2 and the third lens L3 having positive powers and the fifth lens L5 and the sixth lens L6 having positive powers allows minimizing spherical aberration, and allows achieving good optical performance even when the imaging lens is a bright optical system having an F-value of 2.0 or less, for example.

Satisfying the lower limit of the condition expression (5) facilitates increasing the Abbe number with respect to the d-line of the material forming the second lens L2, or reducing the Abbe number with respect to the d-line of the material forming the fourth lens L4, and this facilitates correcting axial chromatic aberration.

Next, the configuration of a fourth embodiment of the disclosure is described. An imaging lens according to the fourth embodiment of the disclosure includes, in order from the object side, a first lens L1 having a negative power, a second lens L2 having a positive power, a third lens L3 having a positive power, a fourth lens L4 having a negative power, a fifth lens L5 having a positive power, and a sixth lens L6 having a positive power.

Further, the imaging lens of the fourth embodiment is configured to satisfy the condition expression below (6):

$$3.2 < vd6/vd4 \qquad (6),$$

where vd4 is an Abbe number with respect to the d-line of a material forming the fourth lens L4, and vd6 is an Abbe number with respect to the d-line of a material forming the sixth lens L6.

The imaging lens of the fourth embodiment is formed by a small number of lenses, namely, six lenses as the minimum configuration thereof, thereby achieving cost reduction and reduction of the entire length in the optical axis direction. The first lens L1, which is the most object-side lens, having a negative power allows achieving a lens system having a wide angle of view, facilitates ensuring the back focus, and facilitates size reduction of the lens system in the radial direction. Distributing the positive power among the second lens L2 and the third lens L3 having positive powers and the fifth lens L5 and the sixth lens L6 having positive powers allows minimizing spherical aberration, and allows achieving good optical performance even when the imaging lens is a bright optical system having an F-value of 2.0 or less, for example.

Satisfying the lower limit of the condition expression (6) facilitates increasing the Abbe number with respect to the d-line of the material forming the sixth lens L6, or reducing the Abbe number with respect to the d-line of the material forming the fourth lens L4, and this facilitates correcting axial chromatic aberration.

It should be noted that the imaging lens according to the first embodiment may have all or part of the features of at least one of the imaging lens according to the second embodiment, the imaging lens according to the third embodiment, and the imaging lens according to the fourth embodiment. The imaging lens according to the second embodiment may have all or part of the features of at least one of the imaging lens according to the first embodiment, the imaging lens according to the third embodiment, and the imaging lens according to the fourth embodiment. The imaging lens according to the third embodiment may have all or part of the features of at least one of the imaging lens according to the first embodiment, the imaging lens according to the second embodiment, and the imaging lens according to the fourth embodiment. The imaging lens according to the fourth embodiment may have all or part of the features of at least one of the imaging lens according to the first embodiment, the imaging lens according to the second embodiment, and the imaging lens according to the third embodiment.

The imaging lenses according to the first to the fourth embodiments of the disclosure may preferably have the following features, which are described together with advantageous effects thereof. As preferred aspects, the imaging lens of each embodiment may have any one of or any combination of the following features:

$$1.8 < (R1+R2)/(R1-R2) \quad (7),$$

$$(R5+R6)/(R5-R6) < 0.0 \quad (8),$$

$$3.0 < (R10+R11)/(R10-R11) < 13.5 \quad (9),$$

$$1 < f12/f < 25 \quad (10),$$

$$-0.8 < (R3+R4)/(R3-R4) < 3.5 \quad (11),$$

$$0.5 < f2/f3 < 4.0 \quad (12),$$

$$0.2 < f5/f6 < 4.0 \quad (13),$$

$$0.4 < f6/f < 4.0 \quad (14),$$

$$0.3 < \#23/f56 < 3.0 \quad (15), \text{ and}$$

$$1.0 < L/f < 5.0 \quad (16),$$

where R1 is a radius of curvature of the object-side surface of the first lens L1,
R2 is a radius of curvature of the image-side surface of the first lens L1,
R3 is a radius of curvature of the object-side surface of the second lens L2,
R4 is a radius of curvature of the image-side surface of the second lens L2,
R5 is a radius of curvature of the object-side surface of the third lens L3,
R6 is a radius of curvature of the image-side surface of the third lens L3,
R10 is a radius of curvature of the object-side surface of the fifth lens L5,
R11 is a radius of curvature of the image-side surface of the fifth lens L5,
f is a focal length of the entire system,
f2 is a focal length of the second lens L2,
f3 is a focal length of the third lens L3,
f5 is a focal length of the fifth lens L5,
f6 is a focal length of the sixth lens L6,
f12 is a combined focal length of the first lens L1 and the second lens L2,
f23 is a combined focal length of the second lens L2 and the third lens L3,
f56 is a combined focal length of the fifth lens L5 and the sixth lens L6, and
L is a distance from the object-side surface of the first lens L1 to the image plane (wherein a portion of the distance corresponding to the back focus is an equivalent air distance).

When the lower limit of the condition expression (7) is satisfied, the first lens L1 is a concave meniscus lens with the absolute value of the radius of curvature of the image-side surface being smaller than the absolute value of the radius of curvature of the object-side surface, and this facilitates correcting distortion.

When the upper limit of the condition expression (8) is satisfied, the third lens L3 is a convex lens with the absolute value of the radius of curvature of the object-side surface being smaller than the absolute value of the radius of curvature of the image-side surface, and this facilitates correcting spherical aberration and field curvature.

Satisfying the upper limit of the condition expression (9) facilitates providing the fifth lens L5 with a strong power, and this facilitates correcting spherical aberration. When the lower limit of the condition expression (9) is satisfied, the fifth lens L5 has a positive meniscus shape with the convex surface toward the image side, and this facilitates correcting spherical aberration and field curvature.

Satisfying the upper limit of the condition expression (10) facilitates keeping the power of first lens L1 relatively small, and this facilitates correcting distortion. Satisfying the lower limit of the condition expression (10) facilitates providing the first lens L1 with a strong power, and this facilitates providing a wide angle of view. Alternatively, satisfying the lower limit of the condition expression (10) facilitates keeping the power of the second lens L2 relatively small, and this facilitates correcting spherical aberration and field curvature.

Satisfying the upper limit of the condition expression (11) facilitates providing the second lens L2 with a strong power, and this facilitates correcting spherical aberration and field curvature. Satisfying the lower limit of the condition expression (11) facilitates preventing the absolute value of the radius of curvature of the object-side surface of the second lens L2, which is convex toward the object side, from becoming small, thereby facilitating correction of distortion.

Satisfying the condition expression (12) facilitates balancing the positive power distributed between the second lens L2 and the third lens L3, thereby facilitating correction of spherical aberration.

Satisfying the condition expression (13) facilitates balancing the positive power distributed between the fifth lens L5 and the sixth lens L6, thereby facilitating correction of spherical aberration.

Satisfying the upper limit of the condition expression (14) facilitates providing the sixth lens L6 with a strong power, thereby facilitating correction of spherical aberration while balancing the powers of the fifth lens L5 and the sixth lens L6. Alternatively, satisfying the upper limit of the condition expression (14) facilitates minimizing the incidence angle of rays onto the image sensor, thereby facilitating suppression of shading. Satisfying the lower limit of the condition expression (14) facilitates keeping the power of the sixth lens L6 relatively small, and this facilitates ensuring the back focus.

Satisfying the condition expression (15) facilitates balancing the positive powers of the lens groups, thereby facilitating correction of spherical aberration and field curvature.

Satisfying the upper limit of the condition expression (16) facilitates reducing the entire lens length, thereby facilitating size reduction of the lens system. Satisfying the lower limit of the condition expression (16) facilitates providing a wide angle of view. Alternatively, satisfying the lower limit of the condition expression (16) prevents the entire length from becoming excessively small to prevent each lens from becoming thin, and this facilitates production of each lens, thereby facilitating reduction of the production cost of the lens.

In order to enhance the above-described advantageous effects, it is preferred that each condition expression with the upper limit or the lower limit as shown below be further added thereto or with the modified lower limit and/or the upper limit as shown below be satisfied. As preferred aspects, each condition expression with a combination of the modified values of the lower limit and the upper limit shown below may be satisfied. Preferred examples of the modified condition expressions are described below; however, modifications of the condition expressions are not limited to those shown below and each condition expression may use a different combination of the modified values shown below.

The upper limit of the condition expression (1) is preferably −1.65. This further facilitates correcting distortion. The upper limit of the condition expression (1) is more preferably −1.68, and is even more preferably −1.69. It is preferred to set the lower limit of the condition expression (1), and the lower limit is preferably −6.0. This facilitates providing the first lens L1 with a strong negative power, thereby facilitating increasing the back focus. The lower limit of the condition expression (1) is more preferably −5.0, is even more preferably −4.0, and is still more preferably −3.6. For these reasons, it is more preferred that any of the condition expressions (1-1) to (1-6) below, for example, be satisfied:

$$f1/f<-1.65 \tag{1-1},$$

$$<-1.68 \tag{1-2},$$

$$-6.0<f1/f<-1.65 \tag{1-3},$$

$$-5.0<f1/f<-1.6 \tag{1-4},$$

$$-4.0<f1/f<-1.68 \tag{1-5},$$

$$-4.0<f1/f<-1.65 \tag{1-6}.$$

The lower limit of the condition expression (2) is preferably −0.65. This further facilitates providing the fourth lens L4 with a strong power, thereby further facilitating correction of axial chromatic aberration. The lower limit of the condition expression (2) is more preferably −0.62 or higher. It is preferred to set the upper limit of the condition expression (2). The upper limit is preferably −0.2. This allows preventing the power of the fourth lens L4 from becoming excessively strong. This facilitates reducing sensitivity to errors due to decentering, or facilitates correcting spherical aberration and field curvature. The upper limit of the condition expression (2) is more preferably −0.3, is even more preferably −0.4, and is still more preferably −0.45. For these reasons, it is more preferred that any of the condition expressions (2-1) to (2-5) below, for example, be satisfied:

$$-0.65<f4/f \tag{2-1},$$

$$-0.62<f4/f \tag{2-2},$$

$$-0.70<f4/f<-0.3 \tag{2-3},$$

$$-0.65<f4/f<-0.4 \tag{2-4},$$

$$-0.62<f4/f<-0.45 \tag{2-5}.$$

The lower limit of the condition expression (3) is preferably 2.8. This prevents the negative power of the first lens L1 from becoming excessively strong, and further facilitates providing the fourth lens L4 with a strong negative power, thereby further facilitating correction of axial chromatic aberration and lateral chromatic aberration. The lower limit of the condition expression (3) is more preferably 3.0, is even more preferably 3.2, and is still more preferably 3.4. It is preferred to set the upper limit of the condition expression (3). The upper limit is preferably 20.0. This allows keeping the power of the fourth lens L4 relatively small to reduce sensitivity of the fourth lens L4 to errors, thereby facilitating production of the imaging lens, or facilitating reducing cost increase. Alternatively, providing the first lens L1 with a strong power facilitates ensuring the angle of view. The upper limit of the condition expression (3) is more preferably 15.0, is even more preferably 14.0, is still more preferably 13.0, and is yet more preferably 12.5. For these reasons, it is more preferred that any of the condition expressions (3-1) to (3-7) below, for example, be satisfied:

$$2.8<f1/f4 \tag{3-1},$$

$$3.0<f1/f4 \tag{3-2},$$

$$3.2<f1/f4 \tag{3-3},$$

$$3.4<f1/f4 \tag{3-4},$$

$$2.4<f1/f4<15.0 \tag{3-5},$$

$$2.8<f1/f4<15.0 \tag{3-6},$$

$$2.4<f1/f4<13.0 \tag{3-7}.$$

The upper limit of the condition expression (4) is preferably 1.8. This further facilitates providing the third lens L3 with a strong power, and this further facilitates correcting spherical aberration and field curvature. The upper limit of the condition expression (4) is more preferably 1.5, is even more preferably 1.4, and is still more preferably 1.3. The lower limit of the condition expression (4) is preferably 0.5. This facilitates keeping the power of the third lens L3 relatively small to reduce sensitivity of the third lens L3 to errors to facilitate production of the imaging lens, or facilitate reducing cost increase. The lower limit of the condition expression (4) is more preferably 0.7, is even more preferably 0.8, and is still more preferably 0.9. For these reasons, it is more preferred that any of the condition expressions (4-1) to (4-6) below, for example, be satisfied:

$$0.0<f3/f<1.5 \tag{4-1},$$

$$0.7<f3/f<2.0 \tag{4-2},$$

$$0.0<f3/f<1.8 \tag{4-3},$$

$$0.5<f3/f<1.5 \tag{4-4},$$

$$0.7<f3/f<1.4 \tag{4-5},$$

$$0.8<f3/f<1.3 \tag{4-6}.$$

The lower limit of the condition expression (5) is preferably 3.1. This further facilitates increasing the Abbe number with respect to the d-line of the material forming the second lens L2, or reducing the Abbe number with respect to the d-line of the material forming the fourth lens L4, thereby further facilitating correction of axial chromatic aberration. It is preferred to set the upper limit of the condition expression (5). The upper limit is preferably 5.0. This facilitates preventing the Abbe number with respect to the d-line of the material forming the fourth lens L4 from becoming excessively small, or preventing the Abbe number with respect to the d-line of the material forming the second lens L2 from becoming excessively large, thereby facilitating reducing increase of the material cost. The upper limit of the condition expression (5) is more preferably 4.5, and is even more preferably 4.0. For these reasons, it is more preferred that any of the condition expressions (5-1) to (5-3) below, for example, be satisfied:

$$3.0 < vd2/vd4 < 5.0 \quad (5\text{-}1)$$

$$3.0 < vd2/vd4 < 4.5 \quad (5\text{-}2)$$

$$3.1 < vd2/vd4 < 5.0 \quad (5\text{-}3)$$

The lower limit of the condition expression (6) is preferably 3.3. This further facilitates increasing the Abbe number with respect to the d-line of the material forming the sixth lens L6, or further facilitates reducing the Abbe number with respect to the d-line of the material forming the fourth lens L4, thereby further facilitating correction of axial chromatic aberration. It is preferred to set the upper limit of the condition expression (6). The upper limit is preferably 5.0. This facilitates preventing the Abbe number with respect to the d-line of the material forming the fourth lens L4 from becoming excessively small, or preventing the Abbe number with respect to the d-line of the material forming the sixth lens L6 from becoming excessively large, thereby facilitating reducing increase of the material cost. The upper limit of the condition expression (6) is more preferably 4.5, and is even more preferably 4.0. For these reasons, it is more preferred that any of the condition expressions (6-1) to (6-5) below, for example, be satisfied:

$$3.3 < vd6/vd4 \quad (6\text{-}1)$$

$$3.2 < vd6/vd4 < 5.0 \quad (6\text{-}2)$$

$$3.2 < vd6/vd4 < 4.5 \quad (6\text{-}3)$$

$$3.3 < vd6/vd4 < 5.0 \quad (6\text{-}4)$$

$$3.2 < vd6/vd4 \quad (6\text{-}5)$$

The lower limit of the condition expression (7) is preferably 2.0. This further facilitates correcting distortion. The lower limit of the condition expression (7) is more preferably 2.2, and is even more preferably 2.3. It is preferred to set the upper limit of the condition expression (7). The upper limit is preferably 8.0. This facilitates providing the first lens L1 with a strong power, thereby facilitates size reduction of the lens system and ensuring the back focus. The upper limit of the condition expression (7) is more preferably 7.0, is even more preferably 6.0, and is still more preferably 5.0. For these reasons, it is more preferred that any of the condition expressions (7-1) to (7-5) below, for example, be satisfied:

$$2.0 < (R1+R2)/(R1-R2) \quad (7\text{-}1)$$

$$2.3 < (R1+R2)/(R1-R2) \quad (7\text{-}2)$$

$$2.2 < (R1+R2)/(R1-R2) < 8.0 \quad (7\text{-}3)$$

$$2.0 < (R1+R2)/(R1-R2) < 6.0 \quad (7\text{-}4)$$

$$2.3 < (R1+R2)/(R1-R2) < 5.0 \quad (7\text{-}5)$$

The upper limit of the condition expression (8) is preferably −0.5. This further facilitates correcting spherical aberration and field curvature. The upper limit of the condition expression (8) is more preferably −1.0, is even more preferably −1.5, and is still more preferably −1.8. It is preferred to set the lower limit of the condition expression (8). The lower limit is preferably −10.0. This facilitates providing the third lens L3 with a strong power, thereby facilitating correction of coma and field curvature. The lower limit of the condition expression (8) is more preferably −8.0, is even more preferably −6.0, and is still more preferably −5.0. For these reasons, it is more preferred that any of the condition expressions (8-1) to (8-6) below, for example, be satisfied:

$$-10.0 < (R5+R6)/(R5-R6) < 0.0 \quad (8\text{-}1)$$

$$-8.0 < (R5+R6)/(R5-R6) < -0.5 \quad (8\text{-}2)$$

$$-6.0 < (R5+R6)/(R5-R6) < -1.0 \quad (8\text{-}3)$$

$$-5.0 < (R5+R6)/(R5-R6) < -1.5 \quad (8\text{-}4)$$

$$-10.0 < (R5+R6)/(R5-R6) < -1.0 \quad (8\text{-}5)$$

$$-5.0 < (R5+R6)/(R5-R6) < -1.8 \quad (8\text{-}6)$$

The upper limit of the condition expression (9) is preferably 10.0. This further facilitates providing the fifth lens L5 with a strong power, thereby further facilitating correction of spherical aberration. The upper limit of the condition expression (9) is more preferably 8.0, is even more preferably 6.0, and is still more preferably 5.0. The lower limit of the condition expression (9) is preferably 3.1. This further facilitates correcting spherical aberration and field curvature. The lower limit of the condition expression (9) is more preferably 3.2. For these reasons, it is more preferred that any of the condition expressions (9-1) to (9-5) below, for example, be satisfied:

$$3.1 < (R10+R11)/(R10-R11) < 13.5 \quad (9\text{-}1)$$

$$3.0 < (R10+R11)/(R10-R11) < 10.0 \quad (9\text{-}2)$$

$$3.0 < (R10+R11)/(R10-R11) < 8.0 \quad (9\text{-}3)$$

$$3.1 < (R10+R11)/(R10-R11) < 6.0 \quad (9\text{-}4)$$

$$3.1 < (R10+R11)/(R10-R11) < 5.0 \quad (9\text{-}5)$$

The upper limit of the condition expression (10) is preferably 22.0. This further facilitates keeping the power of first lens L1 relatively small, thereby further facilitating correction of distortion. The upper limit of the condition expression (10) is more preferably 20.0, is even more preferably 15.0, and is still more preferably 13.0. The lower limit of the condition expression (10) is preferably 1.2. This further facilitates providing the first lens L1 with a strong power, thereby further facilitating increasing the angle of view, or further facilitates keeping the power of the second lens L2 relatively small, thereby further facilitating correction of spherical aberration and field curvature. The lower limit of the condition expression (10) is more preferably 2.0, is even more preferably 2.5, and is still more preferably 3.0. For these reasons, it is more preferred that any of the condition expressions (10-1) to (10-5) below, for example, be satisfied:

$1.2 < f12/f < 22.0$ (10-1), $2.0 < f12/f < 20.0$ (10-2), $2.5 < f12/f < 20.0$ (10-3), $3.0 < f12/f < 15.0$ (10-4), $2.0 < f12/f < 13.0$ (10-5),

The upper limit of the condition expression (11) is preferably 2.5. This facilitates providing the second lens L2 with a strong power, thereby further facilitating correction of spherical aberration and field curvature. The upper limit of the condition expression (11) is more preferably 2.2, and is even more preferably 1.9. The lower limit of the condition expression (11) is preferably −0.7. This further facilitates preventing the absolute value of the radius of curvature the object-side surface of the second lens L2, which is convex toward the object side, from becoming small, thereby further facilitating correction of distortion. The lower limit of the condition expression (11) is more preferably −0.6, is even more preferably −0.5, and is still more preferably −0.4. For these reasons, it is more preferred that any of the condition expressions (11-1) to (11-4) below, for example, be satisfied:

$-0.7 < (R3+R4)/(R3-R4) < 2.5$ (11-1), $-0.6 < (R3+R4)/(R3-R4) < 2.2$ (11-2), $-0.6 < (R3+R4)/(R3-R4) < 1.9$ (11-3), $-0.5 < (R3+R4)/(R3-R4) < 2.2$ (11-4),

The upper limit of the condition expression (12) is preferably 3.3. This further facilitates balancing the positive power distributed between the second lens L2 and the third lens L3, thereby further facilitating correction of spherical aberration. The upper limit of the condition expression (12) is more preferably 2.7, and is even more preferably 2.4. The lower limit of the condition expression (12) is preferably 0.7. This further facilitates balancing the positive power distributed between the second lens L2 and the third lens L3, thereby further facilitating correction of spherical aberration. The lower limit of the condition expression (12) is more preferably 0.9, and is even more preferably 1.0. For these reasons, it is more preferred that any of the condition expressions (12-1) to (12-5) below, for example, be satisfied:

$0.5 < f2/f3 < 3.3$ (12-1), $0.7 < f2/f3 < 2.7$ (12-2), $0.9 < f2/f3 < 2.7$ (12-3), $0.7 < f2/f3 < 2.4$ (12-4), $1.0 < f2/f3 < 2.4$ (12-5),

The upper limit of the condition expression (13) is preferably 3.5. This further facilitates balancing the positive power distributed between the fifth lens L5 and the sixth lens L6, thereby further facilitating correction of spherical aberration. The upper limit of the condition expression (13) is more preferably 2.8, is even more preferably 2.3, and is still more preferably 1.7. The lower limit of the condition expression (13) is preferably 0.3. This further facilitates balancing the positive power distributed between the fifth lens L5 and the sixth lens L6, thereby further facilitating correction of spherical aberration. The lower limit of the condition expression (13) is more preferably 0.4, and is even more preferably 0.7. For these reasons, it is more preferred that any of the condition expressions (13-1) to (13-4) below, for example, be satisfied:

$0.3 < f5/f6 < 3.5$ (13-1), $0.3 < f5/f6 < 2.8$ (13-2), $0.4 < f5/f6 < 2.3$ (13-3), $0.4 < f5/f6 < 1.7$ (13-4).

The upper limit of the condition expression (14) is preferably 3.5. This further facilitates providing the sixth lens L6 with a strong power, thereby further facilitating correction of spherical aberration while balancing the powers of the fifth lens L5 and the sixth lens L6. Alternatively, this facilitates minimizing the incidence angle of rays onto the image sensor, thereby facilitating suppression of shading. The upper limit of the condition expression (14) is more preferably 2.7, is even more preferably 2.2, and is still more preferably 1.6. The lower limit of the condition expression (14) is preferably 0.6. This further facilitates keeping the power of the sixth lens L6 relatively small, thereby further facilitating ensuring the back focus. The lower limit of the condition expression (14) is more preferably 0.8, and is even more preferably 0.9. For these reasons, it is more preferred that any of the condition expressions (14-1) to (14-4) below, for example, be satisfied:

$0.6 < f6/f < 3.5$ (14-1), $0.8 < f6/f < 2.7$ (14-2), $0.9 < f6/f < 2.2$ (14-3), $0.8 < f6/f < 1.6$ (14-4).

The upper limit of the condition expression (15) is preferably 2.5. This further facilitates balancing the positive powers of the lens groups, thereby further facilitating correction of spherical aberration and field curvature. The upper limit of the condition expression (15) is more preferably 2.2, is even more preferably 1.8, and is still more preferably 1.4. The lower limit of the condition expression (15) is preferably 0.4. This further facilitates balancing the positive powers of the lens groups, thereby further facilitating correction of spherical aberration and field curvature. The lower limit of the condition expression (15) is more preferably 0.6, and is even more preferably 0.7. For these reasons, it is more preferred that any of the condition expressions (15-1) to (15-4) below, for example, be satisfied:

$0.4 < f23/f56 < 2.5$ (15-1), $0.6 < f23/f56 < 2.2$ (15-2), $0.6 < f23/f56 < 1.4$ (15-3), $0.7 < f23/f56 < 1.8$ (15-4).

The upper limit of the condition expression (16) is preferably 4.0. This further facilitates reducing the entire lens length, thereby further facilitating size reduction of the lens system. The upper limit of the condition expression (16) is more preferably 3.5, and is even more preferably 3.0. The lower limit of the condition expression (16) is preferably 1.5. This further facilitates providing a wide angle of view, or further facilitates reducing the production cost of the lens. The lower limit of the condition expression (16) is more preferably 1.7, and is even more preferably 1.8. For these reasons, it is more preferred that any of the condition expressions (16-1) to (16-3) below, for example, be satisfied:

$$1.5 < L/f < 4.0 \quad (16\text{-}1),$$

$$1.7 < L/f < 3.5 \quad (16\text{-}2),$$

$$1.8 < L/f < 3.0 \quad (16\text{-}3),$$

The first lens L1 is preferably made of a material having an Abbe number vd1 with respect to the d-line of 40 or more. This facilitates successfully correcting axial chromatic aberration and lateral chromatic aberration. The Abbe number vd1 is more preferably 50 or more, and is even more preferably 55 or more.

The second lens L2 is preferably made of a material having an Abbe number vd2 with respect to the d-line of 55 or more. This facilitates successfully correcting axial chromatic aberration. The Abbe number vd2 is more preferably 58 or more.

The Abbe number vd2 with respect to the d-line of the material forming the second lens L2 is preferably 75 or less. This facilitates reducing the cost of the material forming the second lens L2. The Abbe number vd2 is more preferably 70 or less, and is even more preferably 68 or less.

The third lens L3 is preferably made of a material having an Abbe number vd3 with respect to the d-line of 30 or more. This facilitates successfully correcting axial chromatic aberration. The Abbe number vd3 is more preferably 35 or more, and is even more preferably 38 or more.

The Abbe number vd3 with respect to the d-line of the material forming the third lens L3 is preferably 50 or less. This facilitates correcting lateral chromatic aberration.

The fourth lens L4 is preferably made of a material having an Abbe number vd4 with respect to the d-line of 25 or less. This facilitates correcting axial chromatic aberration. The Abbe number vd4 is more preferably 20 or less, and is even more preferably 19 or less.

The fifth lens L5 is preferably made of a material having an Abbe number vd5 with respect to the d-line of 30 or more. This facilitates correcting axial chromatic aberration and lateral chromatic aberration. The Abbe number vd5 is more preferably 35 or more, and is even more preferably 38 or more.

The sixth lens L6 is preferably made of a material having an Abbe number vd6 with respect to the d-line of 30 or more. This facilitates correcting axial chromatic aberration and lateral chromatic aberration. The Abbe number vd6 is more preferably 40 or more, and is even more preferably 50 or more.

It is preferred that the Abbe number vd1 with respect to the d-line of the material forming the first lens L1 be 40 or more, the Abbe number vd2 with respect to the d-line of the material forming the second lens L2 be 55 or more and 70 or less, the Abbe number vd3 with respect to the d-line of the material forming the third lens L3 be 30 or more, the Abbe number vd4 with respect to the d-line of the material forming the fourth lens L4 be 25 or less, the Abbe number vd5 with respect to the d-line of the material forming the fifth lens L5 be 30 or more, and the Abbe number vd6 with respect to the d-line of the material forming the sixth lens L6 be 30 or more. Satisfying these conditions of the Abbe numbers vd1 to vd6 at the same time allows appropriately selecting the Abbe number of each lens, thereby facilitating correction of axial chromatic aberration and lateral chromatic aberration.

The aperture stop refers to an aperture that determines the F-value (F No.) of the lens system. It is preferred that the aperture stop be disposed on the object side of the fifth lens L5. The description "the aperture stop is disposed on the object side of the fifth lens L5" herein refers to that the center of the aperture stop (the position along the optical axis) is on the object side of the image-side surface of the fifth lens L5. Disposing the aperture stop on the object side of the fifth lens L5 facilitates reducing the aperture diameter of the first lens L1, thereby facilitating reduction of the lens diameter. For example, in the case where the imaging lens of this embodiment is used with an onboard camera, it is desired to reduce an area of the lens exposed outside in order not to impair the appearance of the car. Disposing the aperture stop on the object side of the fifth lens L5 facilitates reducing the aperture diameter of the first lens L1, thereby facilitating reducing an area of the lens exposed outside. This also facilitate minimizing the incidence angle of rays onto the image sensor, thereby facilitating suppression of shading.

It is preferred that the aperture stop be disposed on the object side of the image-side surface of the fourth lens L4. This further facilitates reducing an area of the lens exposed outside, and further facilitates suppression of shading.

It is preferred that the aperture stop be disposed on the image side of the object-side surface of the second lens L2. This facilitates reducing the lens diameter of the lens disposed on the image side of the aperture stop to balance the lens diameters of the lenses disposed in front and rear of the aperture stop, thereby facilitating reducing the diameter of the entire lens.

For these reasons, it is preferred that the aperture stop be disposed between the image-side surface of the fourth lens L4 and the object-side surface of the second lens L2, and it is more preferred that the aperture stop be disposed between the image-side surface of the third lens L3 and the object-side surface of the fourth lens L4.

It is preferred that any of the lens surfaces of the first to the sixth lenses L1 to L6 be an aspheric surface. This allows successfully correcting aberrations.

It is preferred that at least one of the surfaces of the second lens L2 be an aspheric surface. The second lens L2 having at least one of the surfaces being aspheric facilitates correcting field curvature and spherical aberration, thereby achieving good resolution performance. It is more preferred that the both surfaces of the second lens L2 be aspheric.

It is preferred that the object-side surface of the second lens L2 be an aspheric surface. It is preferred that the shape of the object-side surface of the second lens L2 be such that the surface has a positive power both at the center and at the end of the effective diameter thereof, where the positive power at the end of the effective diameter is weaker than the positive power at the center, or the surface has a positive power at the center and has a negative power at the end of the effective diameter. This shape of the object-side surface of the second lens L2 facilitates successfully correcting spherical aberration and field curvature.

It should be noted that the "effective diameter of the surface" as used herein refers to the diameter of a circle formed by the outermost points in the radial direction (points farthest from the optical axis) among points at which all the rays that contribute to imaging intersect with the lens surface, and the description "at the end of the effective diameter" as used herein refers to the outermost points. It should be noted that, while the figure formed by the outermost points is a circle when the system is rotationally symmetric about the optical axis, the figure may not be a circle when the system is not rotationally symmetric. In this case, an equivalent circle may be considered and the effective diameter may be the diameter of the equivalent circle.

With respect to the shape of the aspheric surface, assuming that a point on a lens surface i of one of the lenses is Xi (where i is a symbol representing the corresponding lens surface, and, when the object-side surface of the second lens L2 is denoted by "3", for example, i=3 in the following description for the object-side surface of the second lens L2), and a normal line to the point Xi intersects with the optical axis at an intersection point Pi, a length (|Xi–Pi|) of Xi–Pi is defined as an absolute value |RXi| of the radius of curvature at the point Xi, and Pi is defined as the center of curvature at the point Xi. Further, the intersection point between the i-th lens surface and the optical axis is Qi. Then, the power at the point Xi is defined depending on whether the point Pi is on the object side or on the image side relative to the point Qi. With respect to an object-side surface, the power of the surface is defined as a positive power if the point Pi is on the image side of the point Qi, and defined as a negative power if the point Pi is on the object side of the point Qi. With respect to an image-side surface, the power of the surface is defined as a positive power if the point Pi is on the object side of the point Qi, and defined as a negative power if the point Pi is on the image side of the point Qi.

When the power at the center is compared with the power at the point Xi, the absolute value of the radius of curvature at the center (the paraxial radius of curvature) is compared with the absolute value |RXi| of the radius of curvature at the point Xi. Then, if the value of |RXi| is smaller than the absolute value of the paraxial radius of curvature, it is determined that the power at the point Xi is stronger than the power at the center. In contrast, if the value of |RXi| is greater than the absolute value of the paraxial radius of curvature, it is determined that the power at the point Xi is weaker that the power at the center. This applies regardless of whether the surface has a positive power or a negative power.

The shape of the object-side surface of the second lens L2 where "the surface has a positive power both at the center and at the end of the effective diameter thereof, where the positive power at the end of the effective diameter is weaker than the positive power at the center" means that, assuming that a point X3 is the end of the effective diameter, then the surface has a convex shape in the paraxial region including a point Q3, a point P3 is on the image side of the point Q3, and an absolute value |RX3| of the radius of curvature at the point X3 is greater than an absolute value |R3| of the radius of curvature at the point Q3.

The shape of the object-side surface of the second lens L2 where "the surface has a positive power at the center and has a negative power at the end of the effective diameter" means that, assuming that a point X3 is the end of the effective diameter, then the surface has a convex shape in the paraxial region including a point Q3, and a point P3 is on the object side of the point Q3.

It is preferred that the image-side surface of the second lens L2 be an aspheric surface. It is preferred that the shape of the image-side surface of the second lens L2 be such that the surface has a positive power both at the center and at the end of the effective diameter thereof, where the positive power at the end of the effective diameter is stronger than the positive power at the center. This shape of the image-side surface of the second lens L2 facilitates successfully correcting field curvature.

The shape of the image-side surface of the second lens L2 where "the surface has a positive power both at the center and at the end of the effective diameter thereof, where the positive power at the end of the effective diameter is stronger than the positive power at the center shape" means that, when i=4 for the image-side surface of the second lens L2, assuming that a point X4 is the end of the effective diameter, then the surface has a convex shape in the paraxial region including a point Q4, a point P4 is on the object side of the point Q4, and an absolute value |RX4| of the radius of curvature at the point X4 is smaller than an absolute value |R4| of the radius of curvature at the point Q4.

It is preferred that the object-side surface of the third lens L3 be an aspheric surface. It is preferred that the shape of the object-side surface of the third lens L3 be such that the surface has a positive power both at the center and at the end of the effective diameter thereof, where the positive power at the end of the effective diameter is stronger than the positive power at the center. This shape of the object-side surface of the third lens L3 facilitates successfully correcting field curvature.

The shape of the object-side surface of the third lens L3 where "the surface has a positive power both at the center and at the end of the effective diameter thereof, where the positive power at the end of the effective diameter is stronger than the positive power at the center" means that, when i=5 for the object-side surface of the third lens L3, assuming that a point X5 is the end of the effective diameter, then the surface has a convex shape in the paraxial region including a point Q5, a point P5 is on the image side of the point Q5, and an absolute value |RX5| of the radius of curvature at the point X5 is smaller than an absolute value |R5| of the radius of curvature at the point Q5.

It is preferred that the image-side surface of the third lens L3 be an aspheric surface. It is preferred that the shape of the image-side surface of the third lens L3 be such that the surface has a negative power both at the center and at the end of the effective diameter thereof, where the negative power at the end of the effective diameter is stronger than the negative power at the center. This shape of the image-side surface of the third lens L3 facilitates successfully correcting spherical aberration and field curvature.

The shape of the image-side surface of the third lens L3 where "the surface has a negative power both at the center and at the end of the effective diameter thereof, where the negative power at the end of the effective diameter is stronger than the negative power at the center" means that, when i=6 for the image-side surface of the third lens L3, assuming that a point X6 is the end of the effective diameter, then the surface has a concave shape in the paraxial region including a point Q6, a point P6 is on the image side of the point Q6, and an absolute value |RX6| of the radius of curvature at the point X6 is smaller than the an absolute value |R6| of the radius of curvature at the point Q6.

It is preferred that the absolute value of the radius of curvature of the image-side surface of the second lens L2 be smaller than the absolute value of the radius of curvature of the object-side surface of the second lens L2.

It is preferred that the absolute value of the radius of curvature of the image-side surface of the third lens L3 be greater than the absolute value of the radius of curvature of the object-side surface of the third lens L3.

It is preferred that the absolute value of the radius of curvature of the image-side surface of the fifth lens L5 be smaller than the absolute value of the radius of curvature of the object-side surface of the fifth lens L5.

It is preferred that the absolute value of the radius of curvature of the image-side surface of the sixth lens L6 be greater than the absolute value of the radius of curvature of the object-side surface of the sixth lens L6.

When the absolute value of the radius of curvature of the image-side surface of the second lens L2 is smaller than the absolute value of the radius of curvature of the object-side surface of the second lens L2, and the absolute value of the radius of curvature of the image-side surface of the third lens L3 is greater than the absolute value of the radius of curvature of the object-side surface of the third lens L3, successful correction of spherical aberration, field curvature, and coma can be achieved.

When the absolute value of the radius of curvature of the image-side surface of the fifth lens L5 is smaller than the absolute value of the radius of curvature of the object-side surface of the fifth lens L5, and the absolute value of the radius of curvature of the image-side surface of the sixth lens L6 is greater than the absolute value of the radius of curvature of the object-side surface of the sixth lens L6, successful correction of spherical aberration, field curvature, and coma can be achieved.

It is preferred that each of the image-side surface of the second lens L2, the object-side surface of the third lens L3, the image-side surface of the fifth lens L5, and the object-side surface of the sixth lens L6 be a convex surface. This allows successfully correcting spherical aberration and field curvature.

It is preferred that the first lens L1 have a meniscus shape with the convex surface toward the object side. This facilitates correcting distortion.

It is preferred that the image-side surface of the second lens L2 be a convex surface. This facilitates correcting spherical aberration and field curvature.

It is preferred that the second lens L2 have a meniscus shape or a plano-convex shape with the convex surface toward the image side. This facilitates correcting distortion.

The second lens L2 may have a biconvex shape. This facilitates correcting spherical aberration and field curvature.

It is preferred that the third lens L3 have a meniscus shape or a plano-convex shape with the convex surface toward the object side. This facilitates correcting spherical aberration and field curvature.

It is preferred that the fourth lens L4 have a biconcave shape. This facilitates providing the fourth lens L4 with a strong power, thereby facilitating correction of axial chromatic aberration.

The fourth lens L4 may have a meniscus shape with the convex surface toward the object side or a plano-convex shape with the planar surface toward the object side. This facilitates correcting field curvature.

It is preferred that the absolute value of the radius of curvature of the image-side surface of the fourth lens L4 be smaller than the absolute value of the radius of curvature of the object-side surface of the fourth lens L4. This shape of the fourth lens L4 facilitates correcting spherical aberration and field curvature.

It is preferred that the fifth lens L5 have a meniscus shape or a plano-convex shape with the convex surface toward the image side. This facilitates correcting spherical aberration and field curvature.

It is preferred that the sixth lens L6 have a biconvex shape or a plano-convex shape with the convex surface toward the object side. This facilitates correcting spherical aberration and field curvature.

It is preferred that each of the second lens L2 and the third lens L3 be a convex lens. Distributing the positive power between the two lenses allows successfully correcting spherical aberration.

It is preferred that each of the fifth lens L5 and the sixth lens L6 be a convex lens. Distributing the positive power between the two lenses allows successfully correcting spherical aberration.

It is preferred that the material forming the first lens L1 be glass. In a case where the imaging lens is used in a harsh environment, such as when the imaging lens is used with an onboard camera or a monitoring camera, the first lens L1, which is disposed at the most object-side position, is desired to be made of a material that has resistance to surface degradation due to weather, temperature change due to direct sun light, and chemical agents, such as oil and detergent, i.e., a material having high water resistance, high weather resistance, high acid resistance, high chemical resistance, etc., and may be desired to be made of a material that is firm and is not easily broken. The above-described requirements are met when the material forming the first lens L1 is glass. Alternatively, the material forming the first lens L1 may be a transparent ceramic.

It should be noted that the object-side surface of the first lens L1 may be provided with a protective means for enhancing the strength, scratch resistance, and chemical resistance. In this case, the material forming the first lens L1 may be a plastic. Such a protective means may be a hard coating or a water repellent coating.

A lens for use with an onboard camera, for example, is required to be resistant to various shocks. For this reason, it is preferred that the first lens L1 be thick, and the center thickness of the first lens L1 be 0.8 mm or more.

In order to make an optical system having high resistance to environment, it is preferred that all the lenses are made of glass. In the case where the imaging lens is used with a monitoring camera or an onboard camera, the lens may be used in various conditions, such as in a wide temperature range from high temperatures to low temperatures, highly humid conditions, etc. In order to make an optical system that are highly resistant to such conditions, it is preferred that all the lenses are made of glass.

It is preferred that any of or any combination of the first to the sixth lenses L1 to L6 be made of plastic. Using plastic facilitates making an inexpensive and light weight lens system, and forming an aspheric shape inexpensively and accurately, thereby allowing successful correction of spherical aberration and field curvature.

In order to make a lens system that is highly resistant to temperature change, it is preferred to provide a plastic lens having a positive power and a plastic lens having a negative power. Properties of plastic lenses, in general, are susceptible to temperature change, which results in a focus shift. However, when the lens system includes a plastic lens having a positive power and a plastic lens having a negative power, change of the powers of these lenses are cancelled by each other, thereby minimizing degradation of performance.

Examples of the plastic material include acrylic materials, polyolefin materials, polycarbonate materials, epoxy resins, PET (Polyethylene terephthalate), PES (Poly Ether Sulphone), etc.

Depending on the use of the imaging lens 1, a filter that cuts off light in the range from ultraviolet to blue light or an IR (InfraRed) cut-off filter that cuts off infrared light may be inserted between the lens system and the image sensor 5. A coating having similar properties to those of the above-mentioned filter may be applied to any of the lens surfaces. Alternatively, as a material forming any of the lenses, a material that absorbs ultraviolet light, blue light, infrared light, or the like, may be used.

In the example shown in FIG. 1, the optical member PP, which is assumed to represent the various filters, etc., is disposed between the lens system and the image sensor 5. However, the various filters may be disposed between the lenses, or coatings having the same effects as the various filters may be applied to the lens surfaces of some of the lenses of the imaging lens.

It should be noted that bundles of rays traveling outside the effective diameter between the lenses may become stray light, and the stray light reaching the image plane causes ghost. It is therefore preferred that a light blocking means for blocking the stray light be provided, as necessary. As the light blocking means, for example, an opaque paint may be applied to or an opaque plate material may be provided at an area outside the effective diameter of the lens. Alternatively, an opaque plate material may be provided as the light blocking means in the optical path of bundles of rays that form stray light. Still alternatively, a hood, or the like, for blocking the stray light may be provided on the object side of the most object-side lens. For example, it is preferred to provide, between the fourth lens L4 and the fifth lens L5, a light blocking means that blocks rays traveling outside the effective diameter. The position of the light blocking means is not limited to the above-described examples, and the light blocking means may be provided at any other lens or between any other lenses.

Further, a member such a stop for blocking marginal rays to an extent that no practical problem with the relative illumination occurs may be provided between the lenses. The "marginal rays" refers to rays that travel through the periphery of the entrance pupil of the optical system among rays from object points off the optical axis Z. By providing the member for blocking marginal rays in this manner, image quality at the periphery of the imaging area can be improved. Also, ghost can be reduced by blocking light that causes ghost with this member.

Further, it is preferred that the lens system consist of only the six lenses, i.e., the first lens L1, the second lens L2, the third lens L3, the fourth lens L4, the fifth lens L5, and the sixth lens L6. Forming the lens system only by the six lenses allows making an inexpensive lens system.

An imaging apparatus according to an embodiment of the disclosure which is provided with the imaging lens according to any of the embodiments of the disclosure can be made compact and inexpensive, has a sufficiently wide angle of view, and is capable of obtaining a good image with high resolution by using an image sensor.

It should be noted that an image captured by an imaging apparatus provided with the imaging lens according to any of the first to the fourth embodiments may be displayed on a mobile phone. For example, an imaging apparatus provided with the imaging lens of any of the embodiments may be mounted on a car as an onboard camera to capture a rear view of the car or a view around the car, and the captured image may be displayed on a display unit. In this case, if the car has a car navigation system, the captured image can be displayed on the display unit of the car navigation system; whereas, if the car does not have a car navigation system, it is necessary to install a dedicated display unit, such as a liquid crystal display, on the car. However, such a display unit is expensive. On the other hand, recent mobile phones are provided with a high performance display unit, with which the user can view moving pictures and Web pages. Using a mobile phone as a display unit for the onboard camera eliminates necessity of installing a dedicated display unit on a car that does not have a car navigation system, and this allows inexpensively install the onboard camera on a car.

The image captured by the onboard camera may be transmitted to the mobile phone via a wired communication, such as one using a cable, or via a wireless communication, such as infrared communication. Further, the operating condition of the car may be linked to the mobile phone, or the like, such that, when the gear of the car is shifted to reverse, or the direction indicator is turned on, for example, an image captured by the onboard camera may be automatically displayed on the display unit of the mobile phone.

It should be noted that the display unit on which the image captured by the onboard camera is displayed is not limited to a mobile phone, and any other portable information terminal, such as a PDA, or a compact-type personal computer, or a portable compact-type car navigation system may be used to display the image.

Further, a mobile phone provided with the imaging lens of the disclosure may be secured to a car to use the mobile phone as an onboard camera. Since recent smartphones have processing capacity as high as that of a PC, the camera of the mobile phone can be used as an onboard camera by securing the mobile phone on the dashboard of a car, for example, and directing the camera to the front. As a smartphone application, a function to recognize white lines and traffic signs on the road and issue warnings may be provided. Alternatively, the onboard camera may be directed to the driver to monitor the driver and issue a warning when the driver is drowsy or asleep, the driver is distracted, etc. Still alternatively, the onboard camera may be linked to the car to function as a part of the system for operating the steering wheel. Since cars are left in a high temperature environment or a low temperature environment, onboard cameras are required to have resistance to harsh environments. On the other hand, in the case where the imaging lens of the disclosure is mounted on a mobile phone, the mobile phone is carried out of the car by the driver when the driver is not driving. In this case, the imaging lens only needs to have resistance to less harsh environments, and this allows inexpensively installing the onboard system.

Numerical Examples of Imaging Lens

Figure 8:
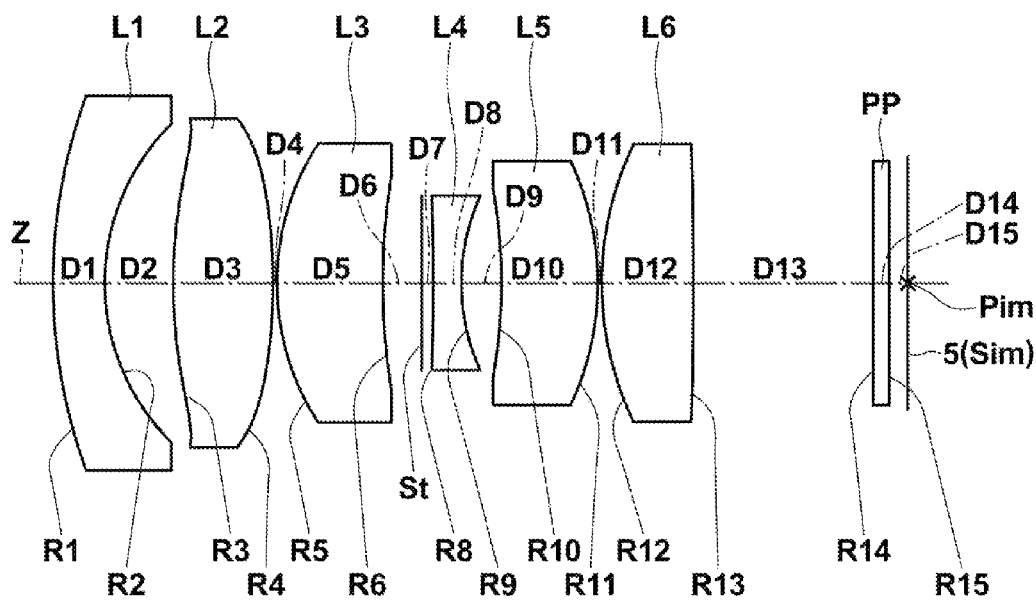
FIG. 8 is a sectional view illustrating the lens configuration of an imaging lens of Example 7 of the disclosure.

Next, numerical examples of the imaging lens of the disclosure are described. FIGS. 2 to 14 show lens sectional views of imaging lenses of Examples 1 to 13. In FIGS. 2 to 14, the left side is the object side, and the right side is the image side. Similarly to FIG. 1, FIGS. 2 to 14 also show the aperture stop St, the optical member PP, and the image sensor 5 positioned in the image plane Sim. The position of the aperture stop St in each drawing does not represents the shape and the size of the aperture stop, but represents the position of the aperture stop along the optical axis Z. In each example, the symbols Ri and Di (where i=1, 2, 3, . . . ) provided in the lens sectional view correspond to the symbols Ri and Di used in the lens data explained below.

Tables 1 to 13 show lens data of the imaging lenses of Examples 1 to 13, respectively. Each table shows basic lens data at (A), various data at (B), and aspheric surface data at (C) if the imaging lens includes aspheric surfaces.

In the basic lens data, each value in the column of "Si" is the surface number of the i-th surface (where i=1, 2, 3, . . . ), where the object-side surface of the most object-side lens element is the 1st surface and the number is sequentially increased toward the image side. Each value in the column of "Ri" is the value of radius of curvature of the i-th surface. Each value in the column of "Di" is the surface distance between the i-th surface and the i+1-th surface along the optical axis Z. It should be noted that the sign with respect to the radius of curvature is provided such that a positive radius of curvature indicates a surface that is convex toward the object side, and a negative radius of curvature indicates a surface that is convex toward the image side. Each value in the column of "Ndj" is the refractive index with respect to the d-line (the wavelength of 587.6 nm) of the j-th element (where j=1, 2, 3, . . . ), where the most object-side lens is the 1st element and the number is sequentially increased toward the image side. Each value in the column of "vdj" is the Abbe number with respect to the d-line of the j-th element. It should be noted that the basic lens data also includes data of the aperture stop St and the optical member PP, and the text "(St)" is shown at the position in the column of the surface number corresponding to the aperture stop St. The image plane is denoted by "IMG".

In the basic lens data, the symbol "*" is added to the surface number of each aspheric surface, and a numerical value of the paraxial radius of curvature (the radius of curvature at the center) is shown as the radius of curvature of each aspheric surface. The aspheric surface data shows the surface number of each aspheric surface and aspheric coefficients about the aspheric surface. The text "E−n" (where n is an integer) following each numerical value of the aspheric surface data means "×10$^{-n}$", and the text "E+n" means "×10$^n$". The aspheric coefficients are values of the coefficients KA and RBm (where m=3, 4, 5, . . . 20) in the formula of aspheric surface shown below:

$$Zd = C \cdot h^2 / \{1 + (1 - KA \cdot C^2 \cdot h^2)^{1/2}\} + \Sigma RBm \cdot h^m,$$

where Zd is a depth of the aspheric surface (a length of a perpendicular line from a point with a height h on the aspheric surface to a plane that is tangent to the apex of the aspheric surface and perpendicular to the optical axis), h is the height (a distance from the optical axis to the lens surface), C is a reciprocal of the paraxial radius of curvature, and KA and RBm are aspheric coefficients (where m=3, 4, 5, . . . 20).

In the various data, "L (in Air)" means a distance from the object-side surface of the first lens L1 to the image plane Sim along the optical axis Z (wherein a portion of the distance corresponding to the back focus is an equivalent air distance), "Bf (in Air)" means a distance from the image-side surface of the most image-side lens to the image plane Sim along the optical axis Z (which is equivalent to the back focus, and the value thereof is an equivalent air distance), "f" is a focal length of the entire system, f1 is a focal length of the first lens L1, f2 is a focal length of the second lens L2, f3 is a focal length of the third lens L3, f4 is a focal length of the fourth lens L4, f5 is a focal length of the fifth lens L5, f6 is a focal length of the sixth lens L6, f12 is a combined focal length of the first lens L1 and the second lens L2, f23 is a combined focal length of the second lens L2 and the third lens L3, and f56 is a combined focal length of the fifth lens L5 and the sixth lens L6.

Table 14 shows values corresponding to the condition expressions (1) to (16) of each example. It should be noted that the value of f1/f is shown for the condition expression (1), the value of f4/f is shown for the condition expression (2), the value of f1/f4 is shown for the condition expression (3), the value of f3/f is shown for the condition expression (4), the value of vd2/vd4 is shown for the condition expression (5), the value of vd6/vd4 is shown for the condition expression (6), the value of (R1+R2)/(R1−R2) is shown for the condition expression (7), the value of (R5+R6)/(R5−R6) is shown for the condition expression (8), the value of (R10+R11)/(R10−R11) is shown for the condition expression (9), the value of f12/f is shown for the condition expression (10), the value of (R3+R4)/(R3−R4) is shown for the condition expression (11), the value of f2/f3 is shown for the condition expression (12), the value of f5/f6 is shown for the condition expression (13), the value of f6/f is shown for the condition expression (14), the value of f23/f56 is shown for the condition expression (15), and the value of L/f is shown for the condition expression (16), where R1 is a radius of curvature of the object-side surface of the first lens L1,
R2 is a radius of curvature of the image-side surface of the first lens L1,
R3 is a radius of curvature of the object-side surface of the second lens L2,
R4 is a radius of curvature of the image-side surface of the second lens L2,
R5 is a radius of curvature of the object-side surface of the third lens L3,
R6 is a radius of curvature of the image-side surface of the third lens L3,
R10 is a radius of curvature of the object-side surface of the fifth lens L5,
R11 is a radius of curvature of the image-side surface of the fifth lens L5,
f is a focal length of the entire system,
f1 is a focal length of the first lens L1,
f2 is a focal length of the second lens L2,
f3 is a focal length of the third lens L3,
f5 is a focal length of the fifth lens L5,
f6 is a focal length of the sixth lens L6,
f12 is a combined focal length of the first lens L1 and the second lens L2,
f23 is a combined focal length of the second lens L2 and the third lens L3,
f56 is a combined focal length of the fifth lens L5 and the sixth lens L6,
vd2 is an Abbe number with respect to the d-line of a material forming the second lens L2,
vd4 is an Abbe number with respect to the d-line of a material forming the fourth lens L4,
vd6 is an Abbe number with respect to the d-line of a material forming the sixth lens L6, and
L is a distance from the object-side surface of the first lens to the image plane (wherein a portion of the distance corresponding to the back focus is an equivalent air distance).

With respect to the units of the numerical values, the unit of length is millimeters; however, this is only an example and any other suitable unit may be used since optical systems are usable when they are proportionally enlarged or reduced.

TABLE 1

Example 1

(A)

| Si | Ri | Di | Ndj | vdj |
|---|---|---|---|---|
| 1 | 9.7909 | 1.71707 | 1.58913 | 61.1 |
| 2 | 6.0454 | 1.74047 | | |
| 3 | −159.9013 | 2.30188 | 1.61800 | 63.3 |
| 4 | −12.5335 | 0.10000 | | |
| 5 | 5.7981 | 2.50000 | 1.88300 | 40.8 |
| 6 | 11.0398 | 1.01055 | | |
| 7(St) | ∞ | 0.29627 | | |
| 8 | −214.1874 | 0.84974 | 1.92286 | 18.9 |
| 9 | 5.7140 | 0.80286 | | |

TABLE 1-continued

Example 1

| Si | Ri | Di | Ndj | vdj |
|---|---|---|---|---|
| 10 | −11.8868 | 2.50000 | 1.88300 | 40.8 |
| 11 | −6.9070 | 0.10068 | | |
| 12 | 8.0314 | 2.30317 | 1.61800 | 63.3 |
| 13 | −60.0000 | 4.00000 | | |
| 14 | ∞ | 0.30000 | 1.51680 | 64.2 |
| 15 | ∞ | 0.83638 | | |
| IMG | | | | |

(B)

| | |
|---|---|
| L(in Air) | 21.3 |
| Bf(in Air) | 5.0 |
| f | 9.78 |
| f1 | −32.32 |
| f2 | 21.88 |
| f3 | 11.30 |
| f4 | −6.02 |
| f5 | 15.11 |
| f6 | 11.61 |
| f12 | 60.86 |
| f23 | 7.19 |
| f56 | 6.28 |

TABLE 2

Example 2

(A)

| Si | Ri | Di | Ndj | vdj |
|---|---|---|---|---|
| 1 | 10.7495 | 1.30000 | 1.5891 | 61.1 |
| 2 | 6.3224 | 1.70175 | | |
| 3 | −259.9001 | 2.30075 | 1.6180 | 63.3 |
| 4 | −12.5331 | 0.10000 | | |
| 5 | 5.6390 | 2.50000 | 1.8830 | 40.8 |
| 6 | 10.9906 | 0.76316 | | |
| 7(St) | ∞ | 0.29510 | | |
| 8 | −41.1880 | 0.80359 | 1.9229 | 18.9 |
| 9 | 5.8918 | 0.80239 | | |
| 10 | −12.1077 | 2.50000 | 1.8830 | 40.8 |
| 11 | −6.6584 | 0.10064 | | |
| 12 | 8.0472 | 2.30312 | 1.6180 | 63.3 |
| 13 | −60.0000 | 5.00000 | | |
| 14 | ∞ | 0.30000 | 1.5168 | 64.2 |
| 15 | ∞ | 0.16109 | | |
| IMG | | | | |

(B)

| | |
|---|---|
| L(in Air) | 20.8 |
| Bf(in Air) | 5.4 |
| f | 9.32 |
| f1 | −29.24 |
| f2 | 21.23 |
| f3 | 10.76 |
| f4 | −5.54 |
| f5 | 13.79 |
| f6 | 11.63 |
| f12 | 62.79 |
| f23 | 6.90 |
| f56 | 6.06 |

TABLE 3

Example 3

(A)

| Si | Ri | Di | Ndj | vdj |
|---|---|---|---|---|
| 1 | 9.4317 | 1.82000 | 1.5891 | 61.1 |
| 2 | 5.9483 | 1.70296 | | |

TABLE 3-continued

Example 3

| Si | Ri | Di | Ndj | vdj |
|---|---|---|---|---|
| 3 | −259.9002 | 2.30076 | 1.6180 | 63.3 |
| 4 | −12.6016 | 0.10000 | | |
| 5 | 5.7847 | 2.50000 | 1.8830 | 40.8 |
| 6 | 10.9945 | 0.85285 | | |
| 7(St) | ∞ | 0.29614 | | |
| 8 | −77.7245 | 0.84974 | 1.9229 | 18.9 |
| 9 | 5.8504 | 0.80282 | | |
| 10 | −11.8594 | 2.50000 | 1.8830 | 40.8 |
| 11 | −6.7550 | 0.10068 | | |
| 12 | 8.2135 | 2.30316 | 1.6180 | 63.3 |
| 13 | −60.0000 | 4.80000 | | |
| 14 | ∞ | 0.30000 | 1.5168 | 64.2 |
| 15 | ∞ | 0.12396 | | |
| IMG | | | | |

(B)

| | |
|---|---|
| L(in Air) | 21.3 |
| Bf(in Air) | 5.1 |
| f | 9.78 |
| f1 | −33.91 |
| f2 | 21.35 |
| f3 | 11.29 |
| f4 | −5.87 |
| f5 | 14.45 |
| f6 | 11.84 |
| f12 | 54.36 |
| f23 | 7.13 |
| f56 | 6.24 |

TABLE 4

Example 4

(A)

| Si | Ri | Di | Ndj | vdj |
|---|---|---|---|---|
| 1 | 10.0226 | 1.70000 | 1.5891 | 61.1 |
| 2 | 6.0755 | 1.50011 | | |
| 3 | −159.8970 | 2.25009 | 1.6180 | 63.3 |
| 4 | −12.8941 | 0.10004 | | |
| 5 | 5.4931 | 2.50002 | 1.8830 | 40.8 |
| 6 | 10.8698 | 0.70207 | | |
| 7(St) | ∞ | 0.20000 | | |
| 8 | −899.2125 | 0.84998 | 1.9229 | 18.9 |
| 9 | 5.3897 | 0.79998 | | |
| 10 | −11.9284 | 2.90000 | 1.8830 | 40.8 |
| 11 | −7.3561 | 0.10000 | | |
| 12 | 8.1255 | 2.30000 | 1.6180 | 63.3 |
| 13 | −80.0000 | 5.00000 | | |
| 14 | ∞ | 0.30000 | 1.5168 | 64.2 |
| 15 | ∞ | 0.45507 | | |
| IMG | | | | |

(B)

| | |
|---|---|
| L(in Air) | 21.6 |
| Bf(in Air) | 5.7 |
| f | 10.06 |
| f1 | −31.16 |
| f2 | 22.56 |
| f3 | 10.33 |
| f4 | −5.80 |
| f5 | 16.75 |
| f6 | 12.06 |
| f12 | 72.90 |
| f23 | 6.85 |
| f56 | 6.62 |

TABLE 5

Example 5

(A)

| Si | Ri | Di | Ndj | vdj |
|---|---|---|---|---|
| 1 | 13.6032 | 1.30000 | 1.5891 | 61.1 |
| 2 | 5.6032 | 1.71617 | | |
| *3 | 12.8058 | 2.50000 | 1.5176 | 63.5 |
| *4 | −15.0189 | 0.10000 | | |
| 5 | 6.4326 | 2.65000 | 1.8830 | 40.8 |
| 6 | 16.4950 | 0.97343 | | |
| 7(St) | ∞ | 0.30013 | | |
| 8 | −60.3046 | 0.70002 | 1.9229 | 18.9 |
| 9 | 5.3341 | 1.01135 | | |
| 10 | −13.5096 | 2.41838 | 1.8830 | 40.8 |
| 11 | −7.2075 | 0.10012 | | |
| 12 | 7.9925 | 2.30001 | 1.6180 | 63.3 |
| 13 | −100.0000 | 4.70000 | | |
| 14 | ∞ | 0.30000 | 1.5168 | 64.2 |
| 15 | ∞ | 0.33203 | | |
| IMG | | | | |

(B)

| | |
|---|---|
| L(in Air) | 21.3 |
| Bf(in Air) | 5.2 |
| f | 9.72 |
| f1 | −17.21 |
| f2 | 13.78 |
| f3 | 10.63 |
| f4 | −5.28 |
| f5 | 14.83 |
| f6 | 12.07 |
| f12 | 44.55 |
| f23 | 6.05 |
| f56 | 6.41 |

(C)

| Surface No. | K | RB3 | RB4 | RB5 | RB6 |
|---|---|---|---|---|---|
| 3 | 0.0000000E+00 | −1.5956838E−03 | 1.6278411E−03 | −8.9229534E−04 | 2.7634660E−04 |
| 4 | 0.0000000E+00 | −7.5282923E−04 | 7.6954353E−04 | −7.4759447E−04 | 1.8316344E−04 |

(C)

| Surface No. | RB7 | RB8 | RB9 | RB10 |
|---|---|---|---|---|
| 3 | −4.0595779E−05 | −1.5036099E−05 | 7.9513119E−06 | −1.1015155E−06 |
| 4 | −1.2693897E−05 | −6.2600067E−06 | 1.7732812E−06 | −2.4531953E−07 |

TABLE 6

Example 6

(A)

| Si | Ri | Di | Ndj | vdj |
|---|---|---|---|---|
| 1 | 10.6851 | 1.30000 | 1.5891 | 61.1 |
| 2 | 5.1383 | 1.73981 | | |
| *3 | 16.0290 | 2.50000 | 1.5176 | 63.5 |
| *4 | −16.8086 | 0.10000 | | |
| 5 | 6.4030 | 2.65000 | 1.8830 | 40.8 |
| 6 | 19.0103 | 0.98790 | | |
| 7(St) | ∞ | 0.30064 | | |
| 8 | −61.1494 | 0.70002 | 1.9228 | 18.9 |
| 9 | 5.4621 | 0.91828 | | |
| 10 | −12.1786 | 2.45658 | 1.8830 | 40.8 |
| 11 | −6.8772 | 0.10000 | | |
| 12 | 8.2431 | 2.30002 | 1.6180 | 63.3 |
| 13 | −100.0000 | 5.00000 | | |
| 14 | ∞ | 0.40000 | 1.5168 | 64.2 |
| 15 | ∞ | 0.30544 | | |
| IMG | | | | |

TABLE 6-continued

Example 6

(B)

| | |
|---|---|
| L(in Air) | 21.6 |
| Bf(in Air) | 5.6 |
| f | 9.78 |
| f1 | −18.40 |
| f2 | 16.27 |
| f3 | 9.95 |
| f4 | −5.41 |
| f5 | 14.70 |
| f6 | 12.42 |
| f12 | 77.55 |
| f23 | 6.25 |
| f56 | 6.45 |

(C)

| Surface No. | K | RB3 | RB4 | RB5 | RB6 |
|---|---|---|---|---|---|
| 3 | 0.0000000E+00 | −1.2122297E−03 | 1.3696011E−03 | −7.1383552E−04 | 2.4890633E−04 |
| 4 | 0.0000000E+00 | −8.0487055E−04 | 8.1164445E−04 | −6.8390789E−04 | 1.6003414E−04 |

(C)

| Surface No. | RB7 | RB8 | RB9 | RB10 | RB11 |
|---|---|---|---|---|---|
| 3 | −4.0674983E−05 | −1.3564392E−05 | 7.7003547E−06 | −1.0465075E−06 | 0.0000000E+00 |
| 4 | −9.3041614E−06 | −5.0412821E−06 | 1.5575402E−06 | −2.4684520E−07 | 0.0000000E+00 |

TABLE 7

Example 7

(A)

| Si | Ri | Di | Ndj | νdj |
|---|---|---|---|---|
| 1 | 13.6032 | 1.30000 | 1.5891 | 61.1 |
| 2 | 5.6032 | 1.71617 | | |
| *3 | 12.8058 | 2.50000 | 1.5176 | 63.5 |
| *4 | −15.0189 | 0.10000 | | |
| 5 | 6.4326 | 2.65000 | 1.8830 | 40.8 |
| 6 | 16.4950 | 0.97343 | | |
| 7(St) | ∞ | 0.30013 | | |
| 8 | −60.3046 | 0.70002 | 1.9228 | 18.9 |
| 8 | 5.3341 | 1.01135 | | |
| 10 | −13.5096 | 2.41838 | 1.8830 | 40.8 |
| 11 | −7.2075 | 0.10012 | | |
| 12 | 7.9925 | 2.30001 | 1.6180 | 63.3 |
| 13 | −100.0000 | 4.50000 | | |
| 14 | ∞ | 0.40000 | 1.5168 | 64.2 |
| 15 | ∞ | 0.46610 | | |
| IMG | | | | |

(B)

| | |
|---|---|
| L(in Air) | 21.3 |
| Bf(in Air) | 5.2 |
| f | 9.71 |
| f1 | −17.21 |
| f2 | 13.78 |
| f3 | 10.63 |
| f4 | −5.28 |
| f5 | 14.83 |
| f6 | 12.07 |
| f12 | 44.55 |
| f23 | 6.05 |
| f56 | 6.41 |

TABLE 7-continued

Example 7

(C)

| Surface No. | K | RB3 | RB4 | RB5 | RB6 |
|---|---|---|---|---|---|
| 3 | 0.0000000E+00 | −1.5956838E−03 | 1.6278411E−03 | −8.9229534E−04 | 2.7634660E−04 |
| 4 | 0.0000000E+00 | −7.5282923E−04 | 7.6954353E−04 | −7.4759447E−04 | 1.8316344E−04 |

(C)

| Surface No. | RB7 | RB8 | RB9 | RB10 | RB11 |
|---|---|---|---|---|---|
| 3 | −4.0595779E−05 | −1.5036099E−05 | 7.9513119E−06 | −1.1015155E−06 | 0.0000000E+00 |
| 4 | −1.2693897E−05 | −6.2600067E−06 | 1.7732812E−06 | −2.4531953E−07 | 0.0000000E+00 |

TABLE 8

Example 8

(A)

| Si | Ri | Di | Ndj | vdj |
|---|---|---|---|---|
| 1 | 13.0000 | 1.29999 | 1.5891 | 61.1 |
| 2 | 6.7473 | 1.69999 | | |
| 3 | 32.8984 | 2.29999 | 1.6180 | 63.3 |
| 4 | −14.2287 | 0.19999 | | |
| 5 | 5.5540 | 2.50000 | 1.8830 | 40.8 |
| 6 | 8.4699 | 0.50000 | | |
| 7(St) | ∞ | 0.34338 | | |
| 8 | −112.8004 | 0.80000 | 1.9229 | 18.9 |
| 9 | 5.8224 | 0.80000 | | |
| 10 | −10.0632 | 2.50000 | 1.8830 | 40.8 |
| 11 | −6.4750 | 0.20000 | | |
| 12 | 8.6908 | 2.30000 | 1.6180 | 63.3 |
| 13 | −80.0000 | 5.95709 | | |
| IMG | | | | |

(B)

| | |
|---|---|
| L(in Air) | 21.4 |
| Bf(in Air) | 5.9 |
| f | 10.10 |
| f1 | −25.80 |
| f2 | 16.38 |
| f3 | 13.03 |
| f4 | −5.98 |
| f5 | 15.50 |
| f6 | 12.81 |
| f12 | 37.80 |
| f23 | 6.98 |
| f56 | 6.67 |

TABLE 9

Example 9

(A)

| Si | Ri | Di | Ndj | vdj |
|---|---|---|---|---|
| 1 | 13.5000 | 1.30000 | 1.5891 | 61.1 |
| 2 | 5.5925 | 1.72764 | | |
| *3 | 9.7899 | 2.50000 | 1.5176 | 63.5 |
| *4 | −16.8921 | 0.20000 | | |
| 5 | 6.3624 | 2.65000 | 1.8830 | 40.8 |
| 6 | 15.1443 | 0.66785 | | |
| 7(St) | ∞ | 0.30067 | | |
| 8 | −61.9457 | 0.70003 | 1.9229 | 18.9 |
| 9 | 5.1062 | 0.96162 | | |
| 10 | −12.8150 | 2.45384 | 1.8348 | 42.7 |
| 11 | −7.1081 | 0.20000 | | |
| 12 | 7.9690 | 2.30002 | 1.6180 | 63.3 |
| 13 | −143.2444 | 5.43417 | | |
| IMG | | | | |

(B)

| | |
|---|---|
| L(in Air) | 21.4 |
| Bf(in Air) | 5.4 |
| f | 10.13 |
| f1 | −17.26 |
| f2 | 12.37 |
| f3 | 10.89 |
| f4 | −5.09 |
| f5 | 15.99 |
| f6 | 12.29 |

TABLE 9-continued

| Example 9 | | | | |
|---|---|---|---|---|
| f12 | | | 32.22 | |
| f23 | | | 5.89 | |
| f56 | | | 6.68 | |

(C)

| Surface No. | K | RB3 | RB4 | RB5 | RB6 |
|---|---|---|---|---|---|
| 3 | 7.2178840E−01 | −1.3669300E−03 | 1.3835279E−03 | −9.0882039E−04 | 1.6359548E−04 |
| 4 | −2.1298090E+00 | −9.9218022E−04 | 7.3431062E−04 | −7.3135958E−04 | 1.7691122E−04 |

(C)

| Surface No. | RB7 | RB8 | RB9 | RB10 |
|---|---|---|---|---|
| 3 | 1.9568894E−04 | −1.5386793E−04 | 4.1918986E−05 | −4.1408207E−06 |
| 4 | 5.7027850E−06 | −2.2950808E−05 | 7.1230757E−06 | −8.3258305E−07 |

TABLE 10

| Example 10 | | | | |
|---|---|---|---|---|

(A)

| Si | Ri | Di | Ndj | νdj |
|---|---|---|---|---|
| 1 | 13.5000 | 1.30006 | 1.5891 | 61.1 |
| 2 | 5.6904 | 1.70676 | | |
| *3 | 9.4726 | 2.50004 | 1.5154 | 60.8 |
| *4 | −19.2557 | 0.20001 | | |
| 5 | 6.2584 | 2.64972 | 1.8830 | 40.8 |
| 6 | 15.1671 | 0.62167 | | |
| 7(St) | ∞ | 0.30029 | | |
| 8 | −104.8557 | 0.70020 | 1.9229 | 18.9 |
| 9 | 4.9025 | 1.00333 | | |
| 10 | −13.0052 | 2.50732 | 1.8160 | 46.6 |
| 11 | −7.2984 | 0.20010 | | |
| 12 | 7.6082 | 2.30000 | 1.6180 | 63.3 |
| 13 | −208.1164 | 5.40622 | | |
| IMG | | | | |

(B)

| L(in Air) | 21.4 |
|---|---|
| Bf(in Air) | 5.4 |
| f | 10.23 |
| f1 | −17.80 |
| f2 | 12.69 |
| f3 | 10.59 |
| f4 | −5.06 |
| f5 | 17.02 |
| f6 | 11.93 |
| f12 | 33.55 |
| f23 | 5.89 |
| f56 | 6.73 |

(C)

| Surface No. | K | RB3 | RB4 | RB5 | RB6 |
|---|---|---|---|---|---|
| 3 | −7.3766090E−01 | −1.7902978E−03 | 1.7131125E−03 | −5.9608603E−04 | −3.0012262E−04 |
| 4 | −2.6077879E+00 | −5.9373974E−04 | −2.6101005E−05 | −9.0765188E−04 | 1.0880323E−03 |

(C)

| Surface No. | RB7 | RB8 | RB9 | RB10 |
|---|---|---|---|---|
| 3 | 4.6972344E−04 | −2.2700314E−04 | 4.9658469E−05 | −4.2290159E−06 |
| 4 | −6.2474546E−04 | 1.7712810E−04 | −2.4032274E−05 | 1.1235690E−06 |

TABLE 11

Example 11

(A)

| Si | Ri | Di | Ndj | vdj |
|---|---|---|---|---|
| 1 | 9.3238 | 1.70002 | 1.5891 | 61.1 |
| 2 | 5.5988 | 1.50007 | | |
| 3 | −5000.1000 | 2.25042 | 1.6180 | 63.3 |
| 4 | −13.0360 | 0.10001 | | |
| *5 | 5.4663 | 2.50046 | 1.8061 | 40.9 |
| *6 | 15.2528 | 0.70092 | | |
| 7(St) | ∞ | 0.29998 | | |
| 8 | −68.2671 | 0.70019 | 1.9229 | 18.9 |
| 9 | 5.3069 | 0.80022 | | |
| 10 | −12.0037 | 2.90042 | 1.8830 | 40.8 |
| 11 | −7.0314 | 0.10004 | | |
| 12 | 8.2763 | 2.29998 | 1.6180 | 63.3 |
| 13 | −80.0000 | 5.00000 | | |
| 14 | ∞ | 0.40000 | 1.5168 | 64.2 |
| 15 | ∞ | 0.23314 | | |
| IMG | | | | |

(B)

| | |
|---|---|
| L(in Air) | 21.3 |
| Bf(in Air) | 5.5 |
| f | 9.87 |
| f1 | −28.63 |
| f2 | 21.15 |
| f3 | 9.49 |
| f4 | −5.31 |
| f5 | 15.09 |
| f6 | 12.26 |
| f12 | 71.69 |
| f23 | 6.42 |
| f56 | 6.42 |

(C)

| Surface No. | K | RB3 | RB4 | RB5 | RB6 |
|---|---|---|---|---|---|
| 5 | 0.0000000E+00 | −7.3313490E−04 | 1.9417616E−03 | −1.0215130E−03 | 4.9984670E−04 |
| 6 | 0.0000000E+00 | −1.7675754E−03 | 3.2721791E−03 | −3.3779271E−03 | 1.7785016E−03 |

(C)

| Surface No. | RB7 | RB8 | RB9 | RB10 | RB11 |
|---|---|---|---|---|---|
| 5 | −1.2703749E−04 | 1.4913582E−05 | 0.0000000E+00 | 0.0000000E+00 | 0.0000000E+00 |
| 6 | −4.8776398E−04 | 5.7019364E−05 | 0.0000000E+00 | 0.0000000E+00 | 0.0000000E+00 |

TABLE 12

Example 12

(A)

| Si | Ri | Di | Ndj | vdj |
|---|---|---|---|---|
| 1 | 9.4616 | 1.70006 | 1.5891 | 61.1 |
| 2 | 5.5765 | 1.50002 | | |
| 3 | −1600.0989 | 2.25002 | 1.6180 | 63.3 |
| 4 | −13.2059 | 0.10000 | | |
| *5 | 5.5969 | 2.50026 | 1.8061 | 40.9 |
| *6 | 14.1507 | 0.84998 | | |
| 7(St) | ∞ | 0.20000 | | |
| 8 | 893.9375 | 0.84997 | 1.9229 | 18.9 |
| 9 | 5.3658 | 0.80001 | | |
| 10 | −11.6782 | 2.89999 | 1.8830 | 40.8 |
| 11 | −7.2508 | 0.10001 | | |
| 12 | 8.1201 | 2.29998 | 1.6180 | 63.3 |
| 13 | −80.0000 | 5.00000 | | |
| 14 | ∞ | 0.40000 | 1.5168 | 64.2 |
| 15 | ∞ | 0.35329 | | |
| IMG | | | | |

TABLE 12-continued

Example 12

(B)

| | |
|---|---|
| L(in Air) | 21.7 |
| Bf(in Air) | 5.6 |
| f | 9.96 |
| f1 | −27.52 |
| f2 | 21.53 |
| f3 | 10.16 |
| f4 | −5.85 |
| f5 | 16.57 |
| f6 | 12.05 |
| f12 | 84.06 |
| f23 | 6.75 |
| f56 | 6.59 |

(C)

| Surface No. | K | RB3 | RB4 | RB5 | RB6 |
|---|---|---|---|---|---|
| 5 | 0.0000000E+00 | −2.2560817E−04 | 2.2753770E−03 | −1.9585518E−03 | 1.0995384E−03 |
| 6 | 0.0000000E+00 | 3.4855282E−03 | −7.9891535E−03 | 7.9992678E−03 | −4.0367159E−03 |

(C)

| Surface No. | RB7 | RB8 | RB9 | RB10 | RB11 |
|---|---|---|---|---|---|
| 5 | −2.8829049E−04 | 3.0696346E−05 | 0.0000000E+00 | 0.0000000E+00 | 0.0000000E+00 |
| 6 | 9.8125289E−04 | −8.8533321E−05 | 0.0000000E+00 | 0.0000000E+00 | 0.0000000E+00 |

TABLE 13

Example 13

(A)

| Si | Ri | Di | Ndj | νdj |
|---|---|---|---|---|
| 1 | 10.8420 | 1.49998 | 1.5891 | 61.1 |
| 2 | 6.5174 | 1.50000 | | |
| 3 | −48.2171 | 2.50001 | 1.6180 | 63.3 |
| 4 | −12.4938 | 0.10000 | | |
| 5 | 6.1670 | 2.99999 | 1.8348 | 42.7 |
| 6 | 11.9971 | 0.89995 | | |
| 7(St) | ∞ | 0.50000 | | |
| 8 | −11.5350 | 0.70004 | 1.9229 | 18.9 |
| 9 | 8.8220 | 0.58372 | | |
| 10 | ∞ | 2.49999 | 1.8830 | 40.8 |
| 11 | −6.8968 | 0.10003 | | |
| 12 | 11.0561 | 2.20004 | 1.6180 | 63.3 |
| 13 | ∞ | 4.80000 | | |
| 14 | ∞ | 0.40000 | 1.5168 | 64.2 |
| 15 | ∞ | 0.45232 | | |
| IMG | | | | |

(B)

| | |
|---|---|
| L(in Air) | 21.6 |
| Bf(in Air) | 5.5 |
| f | 9.65 |
| f1 | −31.83 |
| f2 | 26.58 |
| f3 | 12.32 |
| f4 | −5.33 |
| f5 | 7.81 |
| f6 | 17.89 |
| f12 | 118.31 |
| f23 | 8.04 |
| f56 | 5.46 |

TABLE 14

| | Condition Expression | | | | | | | |
|---|---|---|---|---|---|---|---|---|
| Example | (1) f1/f | (2) f4/f | (3) f1/f4 | (4) f3/f | (5) νd2/νd4 | (6) νd6/νd4 | (7) (R1 + R2)/ (R1 − R2) | (8) (R5 + R6)/ (R5 − R6) |
| 1 | −3.31 | −0.62 | 5.37 | 1.16 | 3.35 | 3.35 | 4.23 | −3.21 |
| 2 | −3.14 | −0.59 | 5.28 | 1.15 | 3.35 | 3.35 | 3.86 | −3.11 |
| 3 | −3.47 | −0.60 | 5.78 | 1.15 | 3.35 | 3.35 | 4.42 | −3.22 |
| 4 | −3.10 | −0.58 | 5.37 | 1.03 | 3.35 | 3.35 | 4.08 | −3.04 |
| 5 | −1.77 | −0.54 | 3.26 | 1.09 | 3.36 | 3.35 | 2.40 | −2.28 |
| 6 | −1.88 | −0.55 | 3.40 | 1.02 | 3.36 | 3.35 | 2.85 | −2.02 |
| 7 | −1.77 | −0.54 | 3.26 | 1.09 | 3.36 | 3.35 | 2.40 | −2.28 |
| 8 | −2.56 | −0.59 | 4.31 | 1.29 | 3.35 | 3.35 | 3.16 | −4.81 |
| 9 | −1.70 | −0.50 | 3.39 | 1.07 | 3.36 | 3.35 | 2.41 | −2.45 |
| 10 | −1.74 | −0.49 | 3.52 | 1.04 | 3.22 | 3.35 | 2.46 | −2.41 |
| 11 | −2.90 | −0.54 | 5.39 | 0.96 | 3.35 | 3.35 | 4.01 | −2.12 |

TABLE 14-continued

| | | | | | | | | | |
|---|---|---|---|---|---|---|---|---|---|
| 12 | −2.76 | −0.59 | 4.70 | 1.02 | 3.35 | 3.35 | 3.87 | | −2.31 |
| 13 | −3.30 | −0.55 | 5.97 | 1.28 | 3.35 | 3.35 | 4.01 | | −3.12 |

| | Condition Expression | | | | | | | |
|---|---|---|---|---|---|---|---|---|
| Example | (9) (R10 + R11)/ (R10 − R11) | (10) f12/f | (11) (R3 + R4)/ (R3 − R4) | (12) f2/f3 | (13) f5/f6 | (14) f6/f | (15) f23/f56 | (16) L/f |
| 1 | 3.77 | 6.22 | 1.17 | 1.94 | 1.30 | 1.19 | 1.14 | 2.17 |
| 2 | 3.44 | 6.74 | 1.10 | 1.97 | 1.19 | 1.25 | 1.14 | 2.23 |
| 3 | 3.65 | 5.56 | 1.10 | 1.89 | 1.22 | 1.21 | 1.14 | 2.17 |
| 4 | 4.22 | 7.25 | 1.18 | 2.19 | 1.39 | 1.20 | 1.03 | 2.14 |
| 5 | 3.29 | 4.59 | −0.08 | 1.30 | 1.23 | 1.24 | 0.94 | 2.19 |
| 6 | 3.59 | 7.93 | −0.02 | 1.64 | 1.18 | 1.27 | 0.97 | 2.21 |
| 7 | 3.29 | 4.59 | −0.08 | 1.30 | 1.23 | 1.24 | 0.94 | 2.19 |
| 8 | 4.61 | 3.74 | 0.40 | 1.26 | 1.21 | 1.27 | 1.05 | 2.12 |
| 9 | 3.49 | 3.18 | −0.27 | 1.14 | 1.30 | 1.21 | 0.88 | 2.11 |
| 10 | 3.56 | 3.28 | −0.34 | 1.20 | 1.43 | 1.17 | 0.88 | 2.09 |
| 11 | 3.83 | 7.26 | 1.01 | 2.23 | 1.23 | 1.24 | 1.00 | 2.16 |
| 12 | 4.28 | 8.44 | 1.02 | 2.12 | 1.38 | 1.21 | 1.03 | 2.18 |
| 13 | −1.00 | 12.26 | 1.70 | 2.16 | 0.44 | 1.85 | 1.47 | 2.24 |

Examples 7 and 11 are assumed to cut rays at a given surface. In Example 7, the object-side surface of the second lens L2 has φ8.0. In Example 11, the object-side surface of the second lens L2 has φ7.0.

The materials forming the lenses of the imaging lenses of Examples 1 to 13 are assumed to be glass. For example, the material forming the first lens L1 of Example 1 (Nd=1.5891, vd=61.1) is S-BAL35 available from Ohara Inc. However, any other material having equivalent properties, such as BACD5 available from HOYA Corporation, K-SK5 available from Sumita Optical Glass, H-ZK3 available from CDGM Glass Co., Ltd., or the like, may be used.

The material forming the second lens L2 of Example 1 (Nd=1.61800, vd=63.3) is S-PHM52 available from Ohara Inc. However, any other material having equivalent properties, such as PCD4 available from HOYA Corporation, M-PCD4 available from HOYA Corporation, K-PSKN2 available from Sumita Optical Glass, H-ZPK1 available from CDGM Glass Co., Ltd., or the like, may be used.

The material forming the third lens L3 of Example 1 (Nd=1.88300, vd=40.8) is S-LAH58 available from Ohara Inc. However, any other material having equivalent properties, such as TAFD30 available from HOYA Corporation, K-LASFN17 available from Sumita Optical Glass, H-ZLAF68 available from CDGM Glass Co., Ltd., or the like, may be used.

The material forming the fourth lens L4 of Example 1 (Nd=1.92286, vd=18.9) is S-NPH2 available from Ohara Inc. However, any other material having equivalent properties, such as H-ZF72A available from CDGM Glass Co., Ltd., or the like, may be used.

The material forming the second lens L2 of Example 5 (Nd=1.5891, vd=61.1) is K-PBK40 available from Sumita Optical Glass. However, any other material having equivalent properties, such as J-BK7 available from HOYA Corporation, D-K59 available from CDGM Glass Co., Ltd., or the like, may be used.

The material forming the fifth lens L5 of Example 9 (Nd=1.8348, vd=42.7) is S-LAH55V available from Ohara Inc. However, any other material having equivalent properties, such as TAFD5F available from HOYA Corporation, K-LASFN8 available from Sumita Optical Glass, H-ZLAF55A available from CDGM Glass Co., Ltd., or the like, may be used.

The material forming the third lens L3 of Example 11 (Nd=1.8061, vd=40.9) is L-LAH53 available from Ohara Inc. However, any other material having equivalent properties, such as S-LAH53 available from Ohara Inc., M-NBFD130 available from HOYA Corporation, NBFD13 available from HOYA Corporation, K-LASFN1 available from Sumita Optical Glass, H-ZLAF52 available from CDGM Glass Co., Ltd., or the like, may be used.

The material forming the optical member PP of Example 1 (Nd=1.5168, vd=64.2) is BSC7 available from HOYA Corporation. However, any other material having equivalent properties, such as S-BSL7 available from Ohara Inc., K-BK7 available from Sumita Optical Glass, H-K9L available from CDGM Glass Co., Ltd., N-BK7 available from Schott AG, or the like, may be used.

The material forming the fourth lens L4 of Example 10 (Nd=1.8160, vd 46.6) is S-LAH59 available from Ohara Inc. However, any other material having equivalent properties, such as TAF5 available from HOYA Corporation, K-LASFN9 available from Sumita Optical Glass, or the like, may be used.

Besides the lenses mentioned above, the lenses having the same values of Nd and vd are assumed to be made of the same glass material or a glass material having the similar properties.

Aberration Performance

FIGS. 15 to 27 show, at A to D, aberration diagrams of the imaging lenses according to Examples 1 to 13.

The following explanation is about aberration diagrams of Example 1 as an example. The same explanation applies to aberration diagrams of the other examples. FIG. 15 shows, at A, B, C, and D, aberration diagrams of spherical aberration, astigmatism, distortion, and lateral chromatic aberration (magnification chromatic aberration), respectively, of the imaging lens according to Example 1. The symbol "F" in the aberration diagram of spherical aberration means "F-value", and the symbol "ω" in the other aberration diagrams means "half angle of view". The aberration diagram of distortion shows amounts of displacement from an ideal image height f×tan(φ), which is expressed by using the focal length f of the entire system and the angle of view φ (which is handled as a variable, where 0≤φ≤ω). The aberration diagrams show aberrations with respect to the d-line (the wavelength of 587.56 nm), which is the reference wavelength. The aberration diagram of spherical aberration also shows aberrations with respect to the F-line (the wavelength of 486.13 nm), the C-line (the wavelength of 656.27 nm), the s-line (the wavelength of 852.11 nm), and the offence against the sine condition (denoted by "SNC"). The aberration diagram of lateral chromatic aberration also shows aberrations with respect to the F-line, the C-line, and the s-line. The line types of the aberration diagram of lateral chromatic aberration are the same as those shown in the aberration diagram of spherical aberration, and the description is omitted in the aberration diagram of lateral chromatic aberration.

As can be seen from the above-described data, each of the imaging lenses of Examples 1 to 13 is formed by the small number of lenses, as small as six lenses, is compact and can be made inexpensively, has a small F-value in the range from 1.6 to 2.0, and has good optical performance with successfully corrected aberrations. These imaging lenses are preferably usable with a monitoring camera or an onboard camera for capturing a front view image, a side view image, a rear view image, etc., of a car.

Embodiment of Imaging Apparatus

FIG. 28 shows, as a use example, a state where imaging apparatuses provided with the imaging lens of any of the embodiments of the disclosure are installed on a car 100. As shown in FIG. 28, the car 100 includes an outboard camera 101 for capturing an image of a blind spot area on the side of the front passenger seat, an outboard camera 102 for capturing an image of a blind spot area on the rear side of the car 100, and an inboard camera 103 attached on the rear side of the rearview mirror to capture an image of the same field of view as that of the driver. The outboard camera 101, the outboard camera 102, and the inboard camera 103 are imaging apparatuses according to an embodiment of the disclosure, each including the imaging lens of any of the examples of the disclosure, and an image sensor that converts an optical image formed by the imaging lens into an electric signal.

The imaging lenses according to the examples of the disclosure have the above-described advantages. Therefore the outboard cameras 101 and 102, and the inboard camera 103 can be made compact and inexpensive, have a wide angle of view, and are capable of obtaining good images throughout the imaging area to the periphery.

The present disclosure has been described with reference to the embodiments and the examples. However, the present disclosure is not limited to the above-described embodiments and examples, and various modifications may be made to the disclosure. For example, the values of the radius of curvature, the surface distance, the refractive index, and the Abbe number of each lens element are not limited to the values shown in the above-described numerical examples and may be different values.

It should be noted that, while all the lenses are made of uniform materials in the above-described examples, a lens with distributed refractive index may be used. Further, while the second lens L2 or the third lens L3 is formed by a refractive lens having aspheric surfaces in some of the above-described examples, one or more lens surfaces may be provided with a diffraction optical element.

Further, while the example where the disclosure is applied to an onboard camera has been described above and shown in the drawing as the embodiment of the imaging apparatus, the above-described use is not intended to limit the disclosure, and the disclosure is also applicable to a camera for a mobile terminal, a monitoring camera, etc., for example.

What is claimed is:

1. An imaging lens consisting of, in order from an object side, a first lens having a negative power, a second lens having a positive power, a third lens having a positive power, a fourth lens having a negative power, a fifth lens having a positive power, and a sixth lens having a positive power, wherein the condition expressions below are satisfied:

$$f1/f < -1.68 \quad (1\text{-}2),$$

$$-0.7 < f4/f \quad (2),$$

$$1 < f12/f < 25 \quad (10),$$

$$-0.6 < (R3+R4)/(R3-R4) < 2.2 \quad (11\text{-}2), \text{ and}$$

$$0.5 < f2/f3 < 4.0 \quad (12),$$

where f1 is a focal length of the first lens, f2 is a focal length of the second lens, f3 is a focal length of the third lens, f4 is a focal length of the fourth lens, R3 is a radius of curvature of an object-side surface of the second lens, R4 is a radius of curvature of an image-side surface of the second lens, f is a focal length of the entire system, and f12 is a combined focal length of the first lens and the second lens.

2. The imaging lens as claimed in claim 1, wherein the first lens is made of a material having an Abbe number with respect to the d-line of 40 or more, the second lens is made of a material having an Abbe number with respect to the d-line of 55 or more, the third lens is made of a material having an Abbe number with respect to the d-line of 30 or more, the fourth lens is made of a material having an Abbe number with respect to the d-line of 25 or less, the fifth lens is made of a material having an Abbe number with respect to the d-line of 30 or more, and the sixth lens is made of a material having an Abbe number with respect to the d-line of 30 or more.

3. The imaging lens as claimed in claim 1, wherein the condition expression below is satisfied:

$$1.8 < (R1+R2)/(R1-R2) \quad (7),$$

where R1 is a radius of curvature of an object-side surface of the first lens, and R2 is a radius of curvature of an image-side surface of the first lens.

4. The imaging lens as claimed in claim 1, wherein the condition expression below is satisfied:

$$(R5+R6)/(R5-R6) < 0.0 \quad (8),$$

where R5 is a radius of curvature of an object-side surface of the third lens, and R6 is a radius of curvature of an image-side surface of the third lens.

5. The imaging lens as claimed in claim 1, wherein the condition expression below is satisfied:

$$3.0 < (R10+R11)/(R10-R11) < 13.5 \quad (9),$$

where R10 is a radius of curvature of an object-side surface of the fifth lens, and R11 is a radius of curvature of an image-side surface of the fifth lens.

6. The imaging lens as claimed in claim 1, wherein the condition expression below is satisfied:

$$0.2 < f5/f6 < 4.0 \quad (13),$$

where f5 is a focal length of the fifth lens, and f6 is a focal length of the sixth lens.

7. The imaging lens as claimed in claim 1, wherein the condition expression below is satisfied:

$$0.4 < f6/f < 4.0 \quad (14),$$

where f is a focal length of the entire system, and f6 is a focal length of the sixth lens.

8. The imaging lens as claimed in claim 1, wherein an aperture stop is disposed between an image-side surface of the fourth lens and an object-side surface of the second lens.

9. The imaging lens as claimed in claim 1, wherein the condition expression below is further satisfied:

$$-0.62 < f4/f \qquad (2\text{-}2),$$

where f4 is a focal length of the fourth lens, and f is a focal length of the entire system.

10. The imaging lens as claimed in claim 1, wherein the condition expression below is further satisfied:

$$-0.70 < f4/f < -0.3 \qquad (2\text{-}3),$$

where f4 is a focal length of the fourth lens, and f is a focal length of the entire system.

11. An imaging apparatus comprising the imaging lens as claimed in claim 1.

12. The imaging lens as claimed in claim 1, wherein the conditional expression below is further satisfied:

$$-0.5 < (R3+R4)/(R3-R4) < 2.2 \qquad (11\text{-}4).$$

13. An imaging lens consisting of, in order from an object side, a first lens having a negative power, a second lens having a positive power, a third lens having a positive power, a fourth lens having a negative power, a fifth lens having a positive power, and a sixth lens having a positive power, wherein the condition expressions below are satisfied:

$$2.4 < f1/f4 \qquad (3),$$

$$0.0 < f3/f < 2.0 \qquad (4), \text{ and}$$

$$3.2 < vd6/vd4 \qquad (6),$$

where f is a focal length of the entire system, f1 is a focal length of the first lens, f3 is a focal length of the third lens, f4 is a focal length of the fourth lens, vd4 is an Abbe number with respect to the d-line of a material forming the fourth lens, and vd6 is an Abbe number with respect to the d-line of a material forming the sixth lens.

14. The imaging lens as claimed in claim 13, wherein the condition expression below is satisfied:

$$-0.8 < (R3+R4)/(R3-R4) < 3.5 \qquad (11),$$

where R3 is a radius of curvature of an object-side surface of the second lens, and R4 is a radius of curvature of an image-side surface of the second lens.

15. The imaging lens as claimed in claim 13, wherein the condition expression below is satisfied:

$$0.5 < f2/f3 < 4.0 \qquad (12),$$

where f2 is a focal length of the second lens, and f3 is a focal length of the third lens.

16. The imaging lens as claimed in claim 13, wherein the condition expression below is further satisfied:

$$2.8 < f1/f4 < 15.0 \qquad (3\text{-}6),$$

where f1 is a focal length of the first lens, and f4 is a focal length of the fourth lens.

17. An imaging lens consisting of, in order from an object side, a first lens having a negative power, a second lens having a positive power, a third lens having a positive power, a fourth lens having a negative power, a fifth lens having a positive power, and a sixth lens having a positive power, wherein the condition expression below is satisfied:

$$3.0 < vd2/vd4 \qquad (5),$$

where vd2 is an Abbe number with respect to the d-line of a material forming the second lens, and vd4 is an Abbe number with respect to the d-line of a material forming the fourth lens.

18. The imaging lens as claimed in claim 17, wherein the condition expression below is further satisfied:

$$3.0 < vd2/vd4 < 4.5 \qquad (5\text{-}2),$$

where vd2 is an Abbe number with respect to the d-line of a material forming the second lens, and vd4 is an Abbe number with respect to the d-line of a material forming the fourth lens.

19. An imaging lens consisting of, in order from an object side, a first lens having a negative power, a second lens having a positive power, a third lens having a positive power, a fourth lens having a negative power, a fifth lens having a positive power, and a sixth lens having a positive power, wherein the second lens is made of a material having an Abbe number with respect to the d-line of 55 or more, and the condition expression below is satisfied:

$$3.2 < vd6/vd4 \qquad (6),$$

where vd4 is an Abbe number with respect to the d-line of a material forming the fourth lens, and vd6 is an Abbe number with respect to the d-line of a material forming the sixth lens.

20. An imaging lens consisting of, in order from an object side, a first lens having a negative power, a second lens having a positive power, a third lens having a positive power, a fourth lens having a negative power, a fifth lens having a positive power, and a sixth lens having a positive power, wherein the condition expressions below are satisfied:

$$f1/f < -1.68 \qquad (1\text{-}2),$$

$$-0.7 < f4/f \qquad (2),$$

$$0.3 < f23/f56 < 3.0 \qquad (15),$$

$$-0.6 < (R3+R4)/(R3-R4) < 2.2 \qquad (11\text{-}2), \text{ and}$$

$$0.5 < f2/f3 < 4.0 \qquad (12),$$

where f1 is a focal length of the first lens, f2 is a focal length of the second lens, f3 is a focal length of the third lens, f4 is a focal length of the fourth lens, R3 is a radius of curvature of an object-side surface of the second lens, R4 is a radius of curvature of an image-side surface of the second lens, f is a focal length of the entire system, f23 is a combined focal length of the second lens and the third lens, and f56 is a combined focal length of the fifth lens and the sixth lens.

* * * * *